US 11,972,386 B2

(12) United States Patent
Maikhuri et al.

(10) Patent No.: US 11,972,386 B2
(45) Date of Patent: Apr. 30, 2024

(54) FRAMEWORK FOR REAL-TIME IN-TRANSIT MATERIAL OWNERSHIP TRANSFER AND INVOICING USING DISTRIBUTED LEDGER (DLT)

(71) Applicant: Dell Products L.P., Round Rock, TX (US)

(72) Inventors: Ajay Maikhuri, Bangalore (IN); Rajesh Krishnan, Bangalore (IN); Dhilip Kumar, Bangalore (IN); Souptik Banerjee, West Bengal (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/818,767

(22) Filed: Aug. 10, 2022

(65) Prior Publication Data
US 2024/0054436 A1    Feb. 15, 2024

(51) Int. Cl.
    G06Q 10/0831    (2023.01)
    G06Q 10/0833    (2023.01)
(52) U.S. Cl.
    CPC ..... *G06Q 10/0831* (2013.01); *G06Q 10/0833* (2013.01); *G06Q 2220/00* (2013.01)
(58) Field of Classification Search
    CPC ........... G06Q 10/0831; G06Q 10/0833; G06Q 2220/00
    (Continued)

(56) References Cited

U.S. PATENT DOCUMENTS 10,037,508 B1    7/2018 Rusnak et al.
10,217,078 B1    2/2019 Klein
(Continued)

FOREIGN PATENT DOCUMENTS

JP          6803879 B2    12/2020
WO    WO-2017112381 A1 *  6/2017    ......... G06Q 10/0833

OTHER PUBLICATIONS

F. Victor and S. Zickau, "Geofences on the Blockchain: Enabling Decentralized Location-Based Services," 2018 IEEE International Conference on Data Mining Workshops (ICDMW), Singapore, Nov. 17-20, 2018, pp. 97-104. https://ieeexplore.ieee.org/document/8637364. (Year: 2018).*

(Continued)

*Primary Examiner* — Jeff Zimmerman
*Assistant Examiner* — Hunter A Molnar
(74) *Attorney, Agent, or Firm* — DALY, CROWLEY, MOFFORD & DURKEE, LLP

(57) ABSTRACT

In a distributed ledger (DLT) network, a transaction, related to movement of a monitored entity from a first party's location to a second party's location, is monitored. The transaction is associated with a respective real-time status and with at least a first predetermined milestone. Sensor outputs from an IoT enabled sensor that is operably coupled to the monitored entity, are received while the monitored entity is located remotely from the first and second parties during its movement from the first location to the second location. Updates to a real-time status of the monitored entity, relating to progress towards a milestone, are determined based on the received sensor outputs. The transaction is updated, in real time, on the DLT network when the milestone is reached. Information is communicated relating to the update of the transaction and the first predetermined milestone, in real-time, to the first party and the second party.

20 Claims, 14 Drawing Sheets

(58) Field of Classification Search
USPC .......................................................... 705/331
See application file for complete search history.

(56) References Cited

U.S. PATENT DOCUMENTS

| | | | |
|---|---|---|---|
| 10,855,758 | B1 | 12/2020 | O'Connell et al. |
| 10,979,872 | B2 | 4/2021 | Klein |
| 11,012,426 | B2 | 5/2021 | Todd |
| 2018/0094953 | A1 | 4/2018 | Colson et al. |
| 2018/0220278 | A1* | 8/2018 | Tal ........................ H04L 9/3236 |
| 2018/0300670 | A1 | 10/2018 | Gabrielson |
| 2019/0012637 | A1* | 1/2019 | Gillen ................... H04L 9/0819 |
| 2020/0034788 | A1* | 1/2020 | Ynion, Jr. ......... G06Q 10/08345 |
| 2023/0266733 | A1* | 8/2023 | Chillar ............ G06Q 10/06375 |
| | | | 700/87 |

OTHER PUBLICATIONS

F. K. Elmay, K. Salah, I. Yaqoob, R. Jayaraman, A. Battah and Y. Maleh, "Blockchain-Based Traceability for Shipping Containers in Unimodal and Multimodal Logistics," in IEEE Access, vol. 10, pp. 133539-133556, Dec. 22, 2022. https://ieeexplore.ieee.org/document/9997538. (Year: 2022).*

International Telecommunication Union (ITU-T), "Technical Report FG DLT D2.1 Distributed Ledger Technology Use Cases;" Technical Report; Telecommunication Standardization Sector of ITU; ITU-T Focus Group on Application of Distributed Ledger Technology (FG DLT); Aug. 1, 2019; 73 Pages.

Jain et al., "Semantic Text Segmentation and Sub-topic Extraction;" Journal Article from Computer Science; Published Jan. 2004; 14 Pages.

* cited by examiner

```
ubuntu@edge-gateway-rpi:~/repo/developer-scripts/releases/geneva/compose-files$ docker ps | less -ESX
CONTAINER ID   IMAGE                                                                   COMMAND                  CREATED          STATUS                PORTS
a124435b9106   enqx/kuiper:0.4.2-alpine                                                "/usr/bin/docker-ent…"   About a minute ago   Up 58 seconds         127.0.0.1:20498->20498
8c6a81c515dc   edgexfoundry/docker-sys-mgmt-agent-go-arm64:1.2.1                       "/sys-mgmt-agent -cp…"   About a minute ago   Up About a minute     127.0.0.1:46090->48090
44689b2c9675   edgexfoundry/docker-app-service-configurable-arm64:1.2.0                "/app-service-config…"   About a minute ago   Up About a minute     48095/tcp, 127.0.0.1:4
cba859a2bc71   edgexfoundry/docker-device-rest-go-arm64:1.1.1                          "/device-rest-go -c …"   About a minute ago   Up About a minute     127.0.0.1:49986->49986
f3b2ffa321ab   edgexfoundry/docker-device-virtual-go-arm64:1.2.2                       "/device-virtual --c…"   About a minute ago   Up About a minute     127.0.0.1:49990->49990
2630aa86eb4d   edgexfoundry/docker-core-data-go-arm64:1.2.1                            "/core-data -cp=cons…"   About a minute ago   Up About a minute     127.0.0.1:55563->55663/t
b08f966f0d2d   edgexfoundry/docker-core-command-go-arm64:1.2.1                         "/core-command -cp=c…"   About a minute ago   Up About a minute     127.0.0.1:48082->48082
a9d797cd172e   edgexfoundry/docker-core-metadata-go-arm64:1.2.1                        "/core-metadata -cp=…"   About a minute ago   Up About a minute     127.0.0.1:48081->48081
50a59f5b0f93   edgexfoundry/docker-support-notifications-go-arm64:1.2.1                "/support-notificati…"   About a minute ago   Up About a minute     127.0.0.1:48060->48060
465b87a8291b   edgexfoundry/docker-support-scheduler-go-arm64:1.2.1                    "/support-scheduler …"   About a minute ago   Up About a minute     127.0.0.1:48085->48085
5ea0e941b1da   edgexfoundry/docker-edgex-consul-arm64:1.2.0                            "edgex-consul-entry…"    About a minute ago   Up About a minute     127.0.0.1:8400->8400/t
283be1195564   arm64v8/redis:5.0.8-alpine                                              "docker-entrypoint.s…"   About a minute ago   Up About a minute     127.0.0.1:6379->6379/t
```

FIG. 10

| | gpsdevice.go X | gps_output_test.txt X |
|---|---|---|
| 1 | | |
| 2 | | $GPRMC,160114.000,A,3745.5964,N,12225.3794,W,0.00,0.00,090419,,,A*7E |
| 3 | | |
| 4 | | $GPGGA,160115.000,3745.5964,N,12225.3794,W,1,07,1.3,7.0,M,-25.3,M,,0000*63 |
| 5 | | |
| 6 | | $GPGSA,M,3,23,09,07,16,03,26,22,,,,,,2.4,1.3,2.0*37 |
| 7 | | |
| 8 | | $GPRMC,160115.000,A,3745.5964,N,12225.3794,W,0.00,0.00,090419,,,A*7E |
| 9 | | |
| 10 | | $GPGGA,160116.000,3745.5964,N,12225.3794,W,1,07,1.3,7.0,M,-25.3,M,,0000*60 |
| 11 | | $GPGSA,M,3,23,09,07,16,03,26,22,,,,,,2.4,1.3,2.0*37 |

FIG. 11

```
type GPSDevice struct {
    lc           logger.LoggingClinet
    asyncCH      chan<- *dsModels.AsyncValues
    switchButton bool
    mux          sync.Mutex
    device       *os.File
    scanner      *bufio.Scanner
    gpsdata      string
}
```

```
type GPSDevice struct {
    Longitude  float64
    Latitude   float64
    Time       int64
    Speed      float64
}
```

FRAMEWORK FOR REAL-TIME IN-TRANSIT MATERIAL OWNERSHIP TRANSFER AND INVOICING USING DISTRIBUTED LEDGER (DLT)

FIELD

Embodiments of the disclosure generally relate to devices, systems, and methods for monitoring transit of goods and taking action based on the monitoring, via a computer system having a plurality of decentralized nodes.

BACKGROUND

Enterprises such as corporations typically have a large information technology (IT) infrastructure comprising a network of computing resources distributed across a geographic environment. Such computing resources may be diverse in nature including, but not limited to, cloud platforms, data centers, employee devices, customer devices, etc. In many scenarios, these computing resources are mobile and may be referred to as mobile compute platforms. These mobile compute platforms, along with servers that communicate with the mobile compute platforms, collectively form a highly distributed system. Mobile compute platforms may be in a variety of forms including, but not limited to, employee mobile devices, customer mobile devices, vehicles (e.g., drones, planes, cars, trucks, other shipping transports, etc.), Internet of Things (IoT) devices (e.g., sensors, tags, other monitoring or display systems, etc.), etc.

Global trade and shipment of goods has benefitted from various types of mobile compute platforms both at the manufacturer and consumer level. For example, at the consumer level, mobile computing devices (e.g., handheld scanners in operable communication with a central database) can be used to scan barcodes attached to goods such as package shipments sent via postal and other carriers, enabling a recipient to track the progress of a delivery package as it passes through various transportation locations and types of transportation, on its way to a recipient. The ability to actively and efficiently engage in global trade and the procurement of goods from vendors is essential to many businesses. Goods procured from vendors undergo various stages of transportation before arriving at their ultimate location. The goods will typically undergo inland transportation from the vendors to ports of origin. Then, the goods are consolidated and loaded into shipping containers, such as ocean equipment containers, for shipping from the ports of origin, or export gateways, to import gateways. Finally, the goods are delivered from the gate ways to their ultimate destination.

SUMMARY

The following presents a simplified summary in order to provide a basic understanding of one or more aspects of the embodiments described herein. This summary is not an extensive overview of all of the possible embodiments and is neither intended to identify key or critical elements of the embodiments, nor to delineate the scope thereof. Rather, the primary purpose of the summary is to present some concepts of the embodiments described herein in a simplified form as a prelude to the more detailed description that is presented later.

Although there have been advances in monitoring and tracking small-scale shipments, like a consumer tracking an online purchase as it is delivered to the consumer's home, via barcode or other scans at certain checkpoints within a given country, the tracking of larger commercial shipments, especially over long distances between contents and/or overseas, is more complex and less amenable to the kinds of solutions that work well with consumers. Moreover, the scale and cost of most consumer shipments is very small and does not need to get info relating to some of the same issues as a business, such as issues of who owns a product during shipment and at what point does a consumer take ownership. In addition, even scanning with barcodes may have limitations. For example, a shipment might have a barcode scanned at a port of departure, but it may be many days before the shipment is loaded onto a vessel and further days still before the vessel is cleared to depart. If an ownership transfer of a shipment is solely based on days that have elapsed since the shipment met a milestone such as arrival at a departure port or loading onto a ship, if there are significant delays, ownership might transfer too early into the shipment, possibly even before a carrier has left its point of origin.

A need exists for improvements addressing the complexities of planning and executing the procurement and transportation of goods from vendors, especially shipments of cargo that need to travel long distances for many days or weeks. For example, consider a situation of a vendor shipping a product from an overseas manufacturer to a buyer on another continent. The main objective of the in-transit inventory ownership transfer is to transfer all the obligations of material to the product company.

The product company negotiates with the vendor for how long the vendor should keep ownership of the material during the transit. As there wasn't a good enough process in place to measure the actual distance covered by the carrier, they divide the fixed approximate lead-time that shipment takes time to reach one location to other. They agree that the vendors keep the ownership of the 70% (21 days) of the lead time and the product company takes the ownership of the material for the rest of 30% (9 days) of the total shipment lead time (30 days). Based on the negotiation, the number of days of material ownership might be different for different vendors.

The product company does not want to take ownership of the material that has not reached a milestone that both parties have aligned and/or agreed to, as that will bring liabilities for the product company. There are some liabilities with taking the ownership of material well ahead, however. For example, one liability is that the product company is liable to pay for the material at the time product company takes the ownership of material and will have to pay even ahead of time if in-transit material movement is not progressing as planned. Another liability is that the product company is liable to incur losses that might happen due to any accident post ownership transfer.

In addition, the carrier charges for the material shipment are based on the approximate distance that shipment might take from vendor location to the product company location and there is no system to validate the actual distance that carrier covered to charge real-time freight.

Advances in computer network technologies and virtualization, along with widespread availability of wireless technologies, have been key to enabling proliferation of the so-called Internet of Things (IoT), which enables many billions of "things," including but not limited to machines, objects, devices, smart phones, computers, smart watches, automobiles, home appliances, personal electronic assistants, cameras, speakers, sensors, tracking devices, etc., to interconnect with each other, collect data and respond to the collected data, and/or to share the data. Availability of wireless network technology such as 5G and the like are helping to further expand the ability of networked computer devices to be dynamic and mobile, enabling the provision of multiple new services and capabilities for many types of users in multiple industries, including medical, military, commercial, financial, industrial, and the like. Further, the data collected by networked computer devices can be a bridge to so-called Big Data systems, as well. In at least some embodiments herein, these advances are used to help address at least some of the issues involved with in transit material ownership transfer. In addition, with increased decentralization of some types of IT infrastructure, e.g., due to the proliferation of mobile and/or distributed computing resources such as edge devices, gateways, IoT devices, etc., implementations such as distributed ledgers have been developed to enable decentralized management of, interaction with, and/or control of, distributed computing resources. At least some embodiments herein utilize distributed ledgers to help improve at least some issues described above.

For example, at least some embodiments herein propose several possible solutions, where at least some solutions provide an arrangement and framework that is able to transfer the in-transit inventory ownership from the vendor to the product company based on the physical inventory movement events and thus able to augment the physical inventory movement events transparently, securely, and immutably.

One general aspect of some embodiments herein includes a computer-implemented method. The computer-implemented method comprises defining, in a distributed ledger (DLT) network, a transaction to be monitored between a first party and a second party, the transaction related to movement of a monitored entity from a first location associated with the first party, to a second location associated with the second party, wherein the transaction is associated with a respective real-time status and with at least a first predetermined milestone. The method also comprises receiving, at first computing device that is in operable communication with the DLT network, one or more sensor outputs from an internet-of-things (IoT) enabled sensor that is operably coupled to the monitored entity, while the monitored entity is located remotely from the first and second parties during its movement from the first location to the second location. The method also comprises determining, in real-time, at the first computing device, one or more updates to a real-time status of the monitored entity, the updates based on the one or more sensor outputs that were received, wherein the one or more updates to the real-time status relate to progress towards the first predetermined milestone. The method also comprises updating, in real-time, the transaction on the DLT network, when the first predetermined milestone has been reached. The method also comprises communicating information relating to the update of the transaction and the first predetermined milestone, in real-time, to the first party and the second party. Other embodiments of this aspect include corresponding computer systems, apparatus, and computer programs recorded on one or more computer storage devices, each configured to perform the actions of the methods.

Implementations may include one or more of the following features. The monitored entity comprises a shipment of material that needs to travel from the first location to the second location. The first predetermined milestone comprises a predetermined position relative to at least one of the first and second locations. The sensor output comprises a global positioning system (GPS) signal comprising information relating to a geographical position of the monitored entity. The first predetermined milestone comprises a predetermined position relative to at least one of the first and second locations. A smart contract is generated when the predetermined milestone is reached, the smart contract relating to the transaction. Ownership of the monitored entity is transferred from the first party to the second party, when the predetermined milestone is reached. The first computing device comprises an edge gateway.

Implementations further may include one or more of the following features. Determining one or more updates to the real-time status of the monitored entity may further comprise: determining one or more second milestones associated with the transaction, wherein the one or more second milestones are different than the first predetermined milestone; defining a subset of milestones selected from at least one of the first predetermined milestone and the one or more second milestones, wherein the subset of milestones comprises milestones that at least one of the first and second parties has deemed to be critical milestones; transmitting a first set of information associated from the edge gateway to an IoT gateway, the first set of information comprising information relating to progress of the monitored entity towards the first predetermined milestone and towards the one or more second milestones; and persisting the subset of milestones in a storage location accessible to at least one of the DLT network and a cloud network.

In some embodiments, the computer-implemented method further comprises generating an invoice for the transaction when the monitored entity reaches at least one of the predetermined milestone and the second location. In some embodiments, the sensor output comprises a signal from at least one sensor selected from the group consisting of: temperature sensors, humidity sensors, pressure sensors, proximity sensors, accelerometers, gas sensors, gyroscopic sensors, optical sensors, and infrared sensors. In some embodiments, the real-time status further comprises information related to tracking a value of the signal from the sensor output and wherein the first predetermined milestone further comprises a physical status of the monitored entity during movement of the monitored entity, the physical status derived from the value of the signal. The transaction further comprises a first predetermined condition associated with the physical status of the monitored entity and wherein the method further comprises comprising transferring ownership of the monitored entity from the first party to the second party only if the physical status, at the time of the first predetermined milestone, satisfies the first predetermined condition. Implementations of the described techniques may include hardware, a method or process, or computer software on a computer-accessible medium.

One general aspect includes a system. The system also comprises a processor; and a non-volatile memory in operable communication with the processor and storing computer program code that when executed on the processor causes the processor to execute a process operable to perform the operations of: defining, in a distributed ledger (DLT) network, a transaction to be monitored between a first party and a second party, the transaction related to movement of a monitored entity from a first location associated with the first party, to a second location associated with the second party, wherein the transaction is associated with a respective real-time status and with at least a first predetermined milestone; receiving, at first computing device that is in operable communication with the DLT network, one or more sensor outputs from an internet-of-things (IoT) enabled sensor that is operably coupled to the monitored entity, while the monitored entity is located remotely from the first and second parties during its movement from the first location to the second location; determining, in real-time, at the first computing device, one or more updates to a real-time status of the monitored entity, the updates based on the one or more sensor outputs that were received, wherein the one or more updates to the real-time status relate to progress towards the first predetermined milestone; updating, in real-time, the transaction on the DLT network, when the first predetermined milestone has been reached; and communicating information relating to the update of the transaction and the first predetermined milestone, in real-time, to the first party and the second party. Other embodiments of this aspect include corresponding computer systems, apparatus, and computer programs recorded on one or more computer storage devices, each configured to perform the actions of the methods.

Implementations may include one or more of the following features. The system wherein the monitored entity comprises a shipment of material that needs to travel from the first location to the second location and wherein the predetermined milestone comprises a predetermined position relative to at least one of the first and second locations. The system further comprises providing computer program code that when executed on the processor causes the processor to perform the operation of transferring ownership of the monitored entity from the first party to the second party when the first predetermined milestone has been reached.

In some embodiments, the system further comprises providing computer program code that when executed on the processor causes the processor to perform the operations of: determining one or more second milestones associated with the transaction, wherein the one or more second milestones are different than the first predetermined milestone; defining a subset of milestones selected from at least one of the first predetermined milestone and the one or more second milestones, wherein the subset of milestones comprises milestones that at least one of the first and second parties has deemed to be critical milestones; transmitting a first set of information associated from an edge gateway to an IoT gateway, the first set of information comprising information relating to progress of the monitored entity towards the first predetermined milestone and towards the one or more second milestones; and persisting the subset of milestones in a storage location accessible to at least one of the DLT network and a cloud network; cloud network.

In some embodiments, the system further comprises providing computer program code that when executed on the processor causes the processor to perform the operation of determining a physical status of the monitored entity during movement of the monitored entity based on a value of the sensor output, wherein the sensor output comprises a signal from at least one sensor selected from the group consisting of: temperature sensors, humidity sensors, pressure sensors, proximity sensors, accelerometers, gas sensors, gyroscopic sensors, optical sensors, and infrared sensors.

Implementations may include one or more of the following features. The one or more second milestones are different than the first predetermined milestone. The sensor output comprises a signal from at least one sensor selected from the group consisting of: temperature sensors, humidity sensors, pressure sensors, proximity sensors, accelerometers, gas sensors, gyroscopic sensors, optical sensors, and infrared sensors. Implementations of the described techniques may include hardware, a method or process, or computer software on a computer-accessible medium.

One general aspect includes a computer program product including a non-transitory computer readable storage medium having computer program code encoded thereon that when executed on a processor of a computer causes the computer to operate a monitoring system. The computer program product also comprises computer program code for defining, in a distributed ledger (DLT) network, a transaction to be monitored between a first party and a second party, the transaction related to movement of a monitored entity from a first location associated with the first party, to a second location associated with the second party, wherein the transaction is associated with a respective real-time status and with at least a first predetermined milestone; computer program code for receiving, at first computing device that is in operable communication with the DLT network, one or more sensor outputs from an internet-of-things (IoT) enabled sensor that is operably coupled to the monitored entity, while the monitored entity is located remotely from the first and second parties during its movement from the first location to the second location. The product also comprises computer program code for determining, in real-time, at the first computing device, one or more updates to a real-time status of the monitored entity, the updates based on the one or more sensor outputs that were received, wherein the one or more updates to the real-time status relate to progress towards the first predetermined milestone. The product also comprises computer program code for updating, in real-time, the transaction on the DLT network, when the first predetermined milestone has been reached. The product also comprises computer program code for communicating information relating to the update of the transaction and the first predetermined milestone, in real-time, to the first party and the second party. Other embodiments of this aspect include corresponding computer systems, apparatus, and computer programs recorded on one or more computer storage devices, each configured to perform the actions of the methods.

Implementations may include one or more of the following features. The computer program product further comprising computer program code for transferring ownership of the monitored entity from the first party to the second party when the first predetermined milestone has been reached. The one or more second milestones are different than the first predetermined milestone; computer program code for defining a subset of milestones selected from at least one of the first predetermined milestone and the one or more second milestones, wherein the subset of milestones comprises milestones that at least one of the first and second parties has deemed to be critical milestones; computer program code for transmitting a first set of information associated from an edge gateway to an IoT gateway, the first set of information comprising information relating to progress of the monitored entity towards the first predetermined milestone and towards the one or more second milestones; and computer program code for persisting the subset of milestones in a storage location accessible to at least one of the DLT network and a cloud network. Implementations of the described techniques may include hardware, a method or process, or computer software on a computer-accessible medium.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims included herein.

Details relating to these and other embodiments are described more fully herein.

BRIEF DESCRIPTION OF THE DRAWINGS

The advantages and aspects of the described embodiments, as well as the embodiments themselves, will be more fully understood in conjunction with the following detailed description and accompanying drawings, in which:

FIG. 10 is an illustration of an exemplary EdgeX containers list, in accordance with one embodiment;

FIG. 11 is an illustration of a sample format of GPS output of the GPS sensor, in accordance with one embodiment;

The drawings are not to scale, emphasis instead being on illustrating the principles and features of the disclosed embodiments. In addition, in the drawings, like reference numbers indicate like elements.

DETAILED DESCRIPTION

Figure 1:
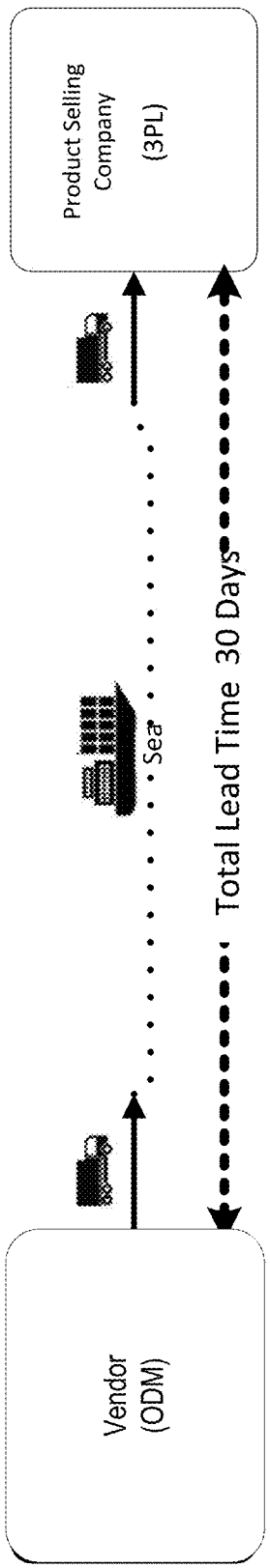
FIG. 1 is an exemplary illustration of a lead time for shipment between a vendor and a product selling company, in accordance with one embodiment.

Before describing details of the particular systems, devices, arrangements, frameworks, and/or methods, it should be observed that the concepts disclosed herein include but are not limited to a novel structural combination of components and circuits, and not necessarily to the particular detailed configurations thereof. Accordingly, the structure, methods, functions, control and arrangement of components and circuits have, for the most part, been illustrated in the drawings by readily understandable and simplified block representations and schematic diagrams, in order not to obscure the disclosure with structural details which will be readily apparent to those skilled in the art having the benefit of the description herein.

Illustrative embodiments will be described herein with reference to exemplary information processing systems and associated host devices, storage devices and other processing devices. It is to be appreciated, however, that embodiments are not restricted to use with the particular illustrative system and device configurations shown. For convenience, certain concepts and terms used in the specification are collected here. The following terminology definitions (which are intended to be broadly construed), which are in alphabetical order, may be helpful in understanding one or more of the embodiments described herein and should be considered in view of the descriptions herein, the context in which they appear, and knowledge of those of skill in the art:

"Blockchain" at least refers to a distributed database or ledger that is shared among the nodes of a computer network (note that, as used herein, the terms "blockchain," "distributed ledger" and "digital ledger" may be used interchangeably) As a database, a blockchain stores information electronically in digital format, where the blockchain guarantees the fidelity and security of a record of data and generates trust without the need for a trusted third party. A blockchain or digital ledger protocol is implemented via a distributed, decentralized computer network of computing resources or nodes. The compute nodes are operatively coupled in a peer-to-peer communications protocol. In the computer network, each compute node is configured to maintain a blockchain which is a cryptographically secured record or ledger of data blocks that represent respective transactions within a given computational environment (e.g., transactions are events associated with reprogramming gateways for one or more new communication protocols and certifying them for Federal Communications Commission (FCC) compliance). The blockchain is secured through use of a cryptographic hash function. As is known, a cryptographic hash function is a cryptographic function which takes an input (or message) and returns a fixed-size alphanumeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction(s) and a hash value of the previous block in the chain, i.e., the previous transaction. That is, each block is typically a group of transactions.

Thus, advantageously, each data block in the blockchain represents a given set of transaction data plus a set of all previous transaction data. In existing digital ledger technologies such as blockchain, an underlying consensus algorithm is typically used to validate new transactions before they are added to the digital ledger. Typically, for example, the new transaction entry is broadcast to all or a subset of nodes within the network and inspected. The entry is formally committed to the blockchain when consensus is reached by the recipient nodes that the entry is valid. Blockchains have become known for their crucial role in cryptocurrency systems, such as Bitcoin, for maintaining a secure and decentralized record of transactions. In embodiments herein, the blockchain distributed ledger may be a "bitcoin" type implementation. The bitcoin system was first described in S. Nakamoto, "Bitcoin: A Peer to Peer Electronic Cash System," 2008, the disclosure of which is incorporated by reference herein in its entirety.

A key principle of the blockchain is that it is trusted. That is, it is critical to know that data in the blockchain has not been tampered with by any of the compute nodes in the network (or any other node or party). For this reason, a cryptographic hash function is used. Each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value. In the case of a bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work." It is to be appreciated that the above description represents an illustrative implementation of the blockchain protocol and that embodiments herein are not limited to the above or any particular blockchain protocol implementation. As such, other appropriate processes may be used to securely maintain and add to a set of data in accordance with embodiments of the invention. For example, distributed ledgers such as, but not limited to, R3 Corda, Ethereum, and Hyperledger may be employed in alternative embodiments.

"Cloud computing" is intended to refer to all variants of cloud computing, including but not limited to public, private, and hybrid cloud computing. In certain embodiments, cloud computing is characterized by five features or qualities: (1) on-demand self-service; (2) broad network access; (3) resource pooling; (4) rapid elasticity or expansion; and (5) measured service. In certain embodiments, a cloud computing architecture includes front-end and back-end components. Cloud computing platforms, called clients or cloud clients, can include servers, thick or thin clients, zero (ultra-thin) clients, tablets and mobile devices. For example, the front end in a cloud architecture is the visible interface that computer users or clients encounter through their web-enabled client devices. A back-end platform for cloud computing architecture can include single tenant physical servers (also called "bare metal" servers), data storage facilities, virtual machines, a security mechanism, and services, all built in conformance with a deployment model, and all together responsible for providing a service. In certain embodiments, a cloud native ecosystem is a cloud system that is highly distributed, elastic and composable with the container as the modular compute abstraction. One type of cloud computing is software as a service (SaaS), which provides a software distribution model in which a third-party provider hosts applications and makes them available to customers over a network such as the Internet. Other types of cloud computing can include infrastructure as a service (IaaS) and platform as a service (PaaS).

"Computer network" refers at least to methods and types of communication that take place between and among components of a system that is at least partially under computer/processor control, including but not limited to wired communication, wireless communication (including radio communication, Wi-Fi networks, BLUETOOTH communication, etc.), cloud computing networks, telephone systems (both landlines and wireless), networks communicating using various network protocols known in the art, military networks (e.g., Department of Defense Network (DDN)), centralized computer networks, decentralized wireless networks (e.g., Helium, Oxen), networks contained within systems (e.g., devices that communicate within and/or to/from a vehicle, aircraft, ship, weapon, rocket, etc.), distributed devices that communicate over a network (e.g., Internet of Things), and any network configured to allow a device/node to access information stored elsewhere, to receive instructions, data or other signals from another device, and to send data or signals or other communications from one device to one or more other devices.

"Computer system" refers at least to processing systems that could include desktop computing systems, networked computing systems, data centers, cloud computing and storage systems, as well as other types of processing systems comprising various combinations of physical and virtual processing resources. A computer system also can include one or more desktop or laptop computers, and one or more of any type of device with spare processing capability. A computer system also may include at least one data center or other type of cloud-based system that includes one or more clouds hosting tenants that access cloud resources.

"Computing resource" at least refers to any device, endpoint, component, element, platform, cloud, data center, storage array, client, server, gateway, or other resource, which is part of an IT infrastructure associated with an enterprise.

"Edge Computing" at least refers to a distributed computing paradigm that brings computation and data storage closer to the sources of data; often, edge computing may involve real-time processing of data, such as data from sensors and/or actuators. In some instances, an objective of edge computing is to move the computation away from data centers towards the edge of a given network, exploiting smart objects, mobile phones, or network gateways to perform tasks and provide services on behalf of the cloud. In illustrative embodiments herein, an "edge server" is a computing device that functionally resides at the edge of a computing platform (e.g., a cloud computing platform) that is configured to send data outside of the computing platform and receive data from outside the computing platform.

"EdgeX Foundry." EdgeX Foundry is an open source, vendor neutral, flexible, interoperable, software platform at the edge of the network, which interacts with the physical world of devices, sensors, actuators, and other IoT objects. EdgeX behaves as edge "middleware"—serving between physical sensing and actuating "things" and our information technology (IT) systems. EdgeX Foundry is a vendor-neutral open source project of the Linux Foundation, building a common open framework for IoT edge computing. EdgeX includes an interoperability framework hosted within a full hardware- and operating system (OS)-agnostic reference software platform to enable an ecosystem of plug-and-play components that unifies the marketplace and accelerates the deployment of IoT solutions. In some embodiments herein, one or more edge gateways and associated edge infrastructure in some embodiments are configured utilizing EdgeX Foundry techniques to implement edge computing functionality, although numerous other configurations may be used. In some embodiments, EdgeX Foundry is utilized as an external IoT services and workflow framework for a given IoT deployment.

"Enterprise" at least refers to one or more businesses, one or more corporations or any other one or more entities, groups, or organizations.

"Entity" at least refers to one or more persons, systems, devices, enterprises, and/or any combination of persons, systems, devices, and/or enterprises.

"Gateway" at least broadly encompasses, for example, a computing node that enables data communications between at least two discrete networks. In certain illustrative embodiments herein, a gateway enables data communication between a network of sensors (e.g., sensors dispersed with material to be shipped and carried about ships or other vehicles) and an edge server.

"Information processing system" as used herein is intended to be broadly construed, so as to encompass, at least, and for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as cloud computing environments, as defined above. Some cloud infrastructures are within the exclusive control and management of a given enterprise, and therefore are considered "private clouds."

"Internet of Things" (IoT) refers at least a broad range of internet-connected devices capable of communicating with other devices and networks, where IoT devices can include devices that themselves can process data as well as devices that gather and transmit data elsewhere for processing. An IoT can include a system of multiple interrelated and/or interconnected computing devices, mechanical and digital machines, objects, animals or people that are provided with unique identifiers (UIDs) and the ability to transfer data over a network without requiring human-to-human or human-to-computer interaction. In some embodiments, mobile compute platforms function as gateways that connect certain IoT devices (e.g., sensors, tags, other monitoring or display systems, actuators, etc.) to edge servers. For example, in some instances, data may stream in from IoT sensors into "islands" of geographically dispersed edge servers. The edge servers then communicate with cloud platforms that are managed by or otherwise host application programs (e.g., analytics or other applications) associated with an enterprise. The applications utilize the data received from the IoT devices and, in some cases, send data to the IoT devices to influence or cause some action.

"IoT ecosystem" at least refers to highly distributed system of IoT devices that is deployed to manage globally distributed IoT devices, such as sensors/actuators (and the data that they generate). These ecosystems may have a tiered model where a central cloud connects to a set of edge servers, and the edge servers in turn interface with IoT devices (e.g., the sensors and actuators) via one or more gateways.

"In transit inventory" at least refers to inventory shipped by the seller but has not yet reached the buyer's agreed destination. In this case, the seller could be a contract manufacturer, and the buyer is the company or organization that owns the product to sell to the customer.

"In transit inventory ownership" at least refers to various arrangements defining which party owns inventory in different points in the shipping cycle. For example, there are several types of In-transit inventory ownership:
1. Freight on Board (FOB) Shipping is the process where the buyer owns the material as soon as the material is boarded on the ship;
2. Freight on Board (FOB) Destination where seller owns the material till it reaches the destination;
3. Cost, insurance, and Freight (CIF) shipment were materials owned by the seller as he pays the Cost, Insurance, and Freight. The buyer gets ownership of it as soon as it reaches the destination port; and
4. In eCommerce shipping, an eCommerce merchant has the ownership of the inventory till it reaches the end-customer.

"Mobile Compute Platforms" at least refer to portable electronic devices having hardware and software capabilities, e.g., to execute productivity applications, Web applications, business applications, etc., where the electronic device often is expected to be transported during normal usage. Mobile compute platforms may include devices such as laptop computers, tablets, netbooks, mobile phones, and also can include a variety of IoT devices. Mobile compute platforms can come in a variety of forms including, but not limited to, employee mobile devices, customer mobile devices, and compute platforms in various vehicles (e.g., drones, planes, cars, trucks, other shipping transports, etc.).

"Public Cloud" at least refers to cloud infrastructures that are used by multiple enterprises, and not necessarily controlled or managed by any of the multiple enterprises but rather are respectively controlled and managed by third-party cloud providers. Entities and/or enterprises can choose to host their applications or services on private clouds, public clouds, and/or a combination of private and public clouds (hybrid clouds) with a vast array of computing resources attached to or otherwise a part of such IT infrastructure.

"Smart Contract" at least refers to programs stored on a blockchain that run when predetermined conditions are met, such as computer code that automatically executes all or parts of an agreement, where the smart contract code is stored on a blockchain-based platform. For example, smart contracts may be used to automate the execution of an agreement so that all participants can be immediately certain of the outcome, without any intermediary's involvement or time loss. Smart contracts permit trusted transactions and agreements to be carried out among disparate, anonymous parties without the need for a central authority, legal system, or external enforcement mechanism. In addition, smart contracts also can be configured to automate a workflow, triggering the next action when conditions are met. For example, a network of computers can be configured to execute certain predetermined actions when predetermined conditions have been met and verified. An associated blockchain is then updated when the transaction is completed.

Unless specifically stated otherwise, those of skill in the art will appreciate that, throughout the present detailed description, discussions utilizing terms such as "opening", "configuring," "receiving,", "detecting," "retrieving," "converting", "providing,", "storing," "checking", "uploading", "sending,", "determining", "reading", "loading", "overriding", "writing", "creating", "including", "generating", "associating", and "arranging", and the like, refer to the actions and processes of a computer system or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The disclosed embodiments are also well suited to the use of other computer systems such as, for example, optical and mechanical computers. Additionally, it should be understood that in the embodiments disclosed herein, one or more of the steps can be performed manually.

In addition, as used herein, terms such as "module," "system," "subsystem," "engine," "gateway," "device," "machine," "interface," and the like are intended to refer to a computer-implemented or computer-related in this application. The terms "component," "module," "system", "interface", "engine", or the like are generally intended to refer to a computer-related entity or article of manufacture, either hardware, software, a combination of hardware and software, software, or software in execution. For example, a module includes but is not limited to, a processor, a process or program running on a processor, an object, an executable, a thread of execution, a computer program, and/or a computer. That is, a module can correspond to both a processor itself as well as a program or application running on a processor. As will be understood in the art, as well, modules and the like can be distributed on one or more computers.

Further, references made herein to "certain embodiments," "one embodiment," "an exemplary embodiment," and the like, are intended to convey that the embodiment described might be described as having certain features or structures, but not every embodiment will necessarily include those certain features or structures, etc. Moreover, these phrases are not necessarily referring to the same embodiment. Those of skill in the art will recognize that if a particular feature is described in connection with a first embodiment, it is within the knowledge of those of skill in the art to include the particular feature in a second embodiment, even if that inclusion is not specifically described herein.

Additionally, the words "example" and/or "exemplary" are used herein to mean serving as an example, instance, or illustration. No embodiment described herein as "exemplary" should be construed or interpreted to be preferential over other embodiments. Rather, using the term "exemplary" is an attempt to present concepts in a concrete fashion. In addition, the articles "a" and "an" as used in this application and the appended claims should generally be construed to mean "one or more" unless specified otherwise or clear from context to be directed to a singular form.

Before describing in detail the particular improved systems, devices, and methods, it should be observed that the concepts disclosed herein include but are not limited to a novel structural combination of software, components, and/or circuits, and not necessarily to the particular detailed configurations thereof. Accordingly, the structure, methods, functions, control and arrangement of components and circuits have, for the most part, been illustrated in the drawings by readily understandable and simplified block representations and schematic diagrams, in order not to obscure the disclosure with structural details which will be readily apparent to those skilled in the art having the benefit of the description herein.

The following detailed description is provided, in at least some examples, using the specific context of an exemplary arrangement for shipping cargo or other material and modifications and/or additions that can be made to such a system to achieve the novel and non-obvious improvements described herein. Other types or arrangements that involve movement of material from one location to another separate location, may also be used, and specific reference to specific arrangements and types of shipping or movement is meant to be primarily for example or illustration. Moreover, those of skill in the art will appreciate that the disclosures herein are not, of course, limited to only the types of examples given herein, but are readily adaptable to many different types of arrangements that involve movement of material (e.g., tracking movement of military supplies, vehicles, and/or personnel, as but one example).

Optimizing the process of material ownership is vital for companies that take on liabilities that can impact their operational expenditures inventory ownership records. Hence, improvements in tracking and aligning the material ownership, such as at the agreed distance covered, can help to optimize such operations. The traditional supply chain involves a lot of paperwork, in part to limited visibility of the movement of physical materials during transit, as well as lags in receiving information relating to physical material movements. Supply chain paperwork helps both parties to these transactions (e.g., vendors and product seller) to agree to a term of fixed bounded lead time-based ownership. Even when this paperwork migrates to the digital realm, there are still tradeoffs because of a lack of trustable platform that enables real-time ownership and also due to the high costs cost to build and maintain a digital version of supply chain paperwork, which can be an issue for small-scale vendors.

Despite these issues, there is still a critical need for the product company to track the real-time material movement and ownership when it reaches the milestone that both vendor and product company have aligned in a common platform. Building this platform only for product companies can be advantageous even if it not always the most cost-effective solution, because doing so enables and monetizes this platform for all vendors. In some embodiments, providing a platform to track real-time material movement and ownership, as a service model, can be cost-effective.

Consider two examples: (a) shipping a laptop computer from the Asia Pacific Japan China (APJC) region to a warehouse in the United States of America (USA), and (b) shipping crude oil exported from Saudi Arabia to Europe. In both example (a) and example (b), the two locations are quite far away and the delivery takes weeks to reach the destination. In these example, the material being shipped is called transit inventory. While it is in transit, it is the responsibility of the seller to pack and store the product appropriately.

In-transit material ownership is always a critical process. Product selling companies (e.g., sellers of laptop computers), understandably, try to delay the ownership of in-transit material to avoid the obligations and negotiate with the vendors to keep the ownership of the in-transit material as much as possible. However, with currently used arrangements and processes, it is a fixed lead-time configured to transfer ownership from the vendor to a product selling company. FIG. 1 is an exemplary illustration of a lead time for shipment between a vendor and a product selling company, in accordance with one embodiment. As FIG. 1 shows, the average lead time for a carrier is 30 calendar days to move product from China to the Americas.

However, in such a situation, the question of ownership arises—who owns the inventory during transit and/or at different points in transit, the buyer, the seller, or neither? An important objective of the in-transit inventory ownership transfer is to transfer all the material obligations from the vendor to the product company.

As is known, there are several types of In-transit inventory ownership.
1. Freight on Board (FOB) Shipping is the process where the buyer owns the material as soon as the material is boarded on the ship.
2. Freight on Board (FOB) Destination where seller owns the material till it reaches the destination.
3. Cost, insurance, and Freight (CIF) shipment were materials owned by the seller as he pays the Cost, Insurance, and Freight. The buyer gets ownership of it as soon as it reaches the destination port.
4. In eCommerce shipping, an eCommerce merchant has the ownership of the inventory till it reaches the end-customer.

Figure 2:
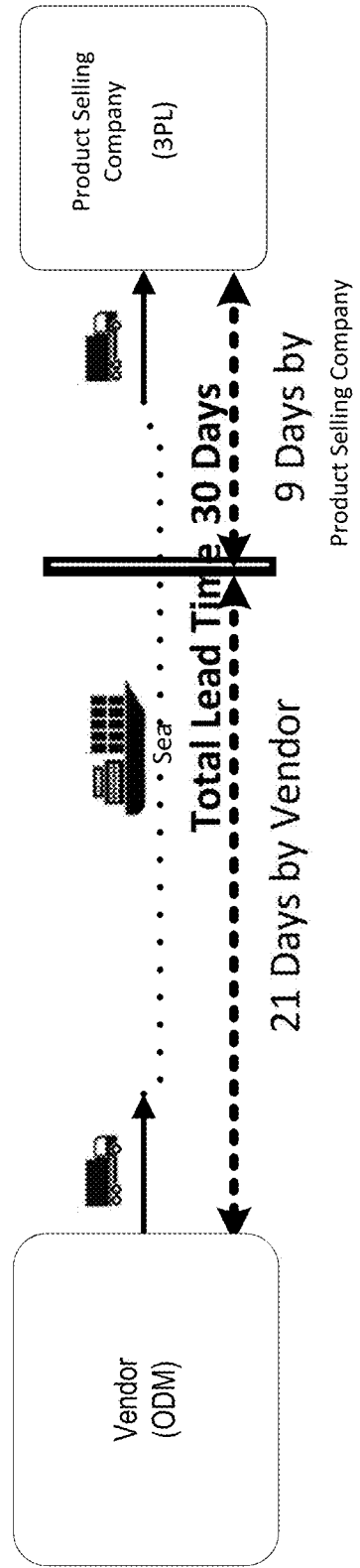
FIG. 2 is an example illustration showing a lead time break up between vendor and seller, in accordance with one embodiment.

The In-transit inventory ownership types 1, 2, and 4 above present straightforward ownership and will have little to no complexity. Nonetheless, CIF shipment is complex and needs periodical optimization since the material cost, insurance, and freight charges are involved. Hence, in some arrangements, the product companies negotiate with the seller/vendor [in this case, contract manufacturer] ownership of the material based on number of days in transit. For example, a product selling company might negotiate to take ownership from the vendor once the carrier reaches 75% of the total lead time. FIG. 2 is an example illustration showing a lead time break up between vendor and seller, in accordance with one embodiment. In this scenario, the product selling company takes ownership on the 23$^{rd}$ day.

The buyer (product company) usually prefers not to get ownership of the material that has not reached a milestone that both parties have aligned, because that can lead to liabilities for the buyer. Even though CIF (Cost, insurance, and Freight) provides a fixed destination port, the freight cost is based on the actual distance covered by the carrier. The fixed distance port does not give enough opportunities to negotiate with the seller (a contract manufacturer) compared to the actual distance covered. There are at least the following liabilities by taking the ownership of material well ahead:
1. The buyer (product company) is responsible for paying for the material. The time product company takes the ownership of material, it will have to pay even ahead of time if in-transit material movement is not progressing as planned; and
2. The buyer (product company) is responsible for incurring any losses that might happen due to any accident post ownership transfer.

Currently, in transit, material ownership transfer is not done based on the actual distance covered during shipment, because there is no real-time tracking of the carrier leveraged in this process, and the carrier might be delayed due to the following reasons:
1. The carrier might not move as planned due to various operational challenges like carrier breakdown, etc.
2. The carrier might not move as planned due to natural calamities like hurricanes or any other reason like lockdown, strike, etc. For example, In March 2021, a ship got stuck in the Suez Canal, causing delays in movement and delivery of its cargo.

Figure 3:
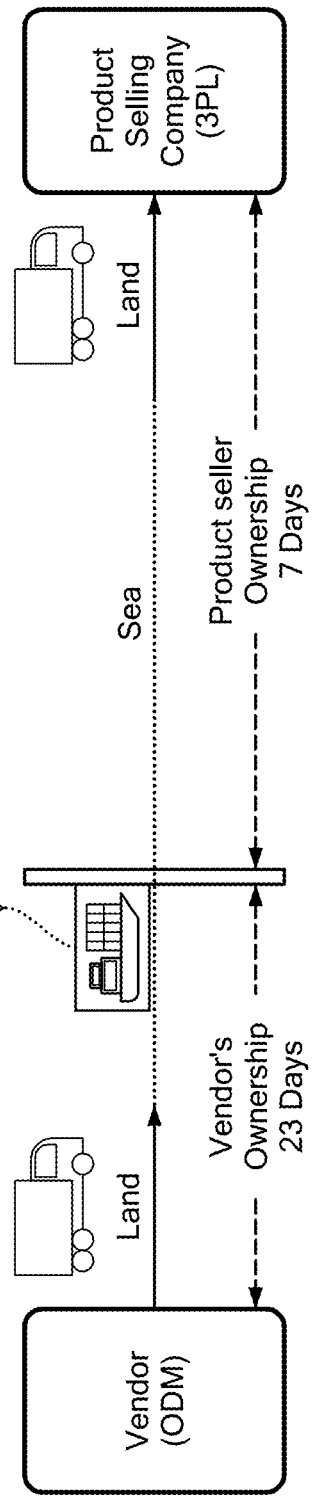
FIG. 3 is an example illustration showing a lead-time breakup where distance traveled at ownership transfer is less than expected, in accordance with one embodiment.

FIG. 3 is an example illustration showing a lead-time breakup where distance traveled at ownership transfer is less than expected, in accordance with one embodiment. As FIG. 3 shows, the carrier (combination of truck land and sea) has covered only 20% of the travel distance at the 23-day mark, due to a disruption. However, in accordance with contract terms, the in-transit material ownership has been transferred to the product seller company at the 23-day mark, even though the carrier did not cross 75% of the actual travel distance. In the situation of FIG. 3, significant distance (and travel risks/liability) still remain, at the 23-day point, when the product seller takes ownership.

Technology is constantly evolving, and supply chains are adopting newer technologies for optimization and improving operational efficiencies. There is an opportunity to transfer the ownership of the material from vendor to the product company based on actual distance travelled by the carrier instead of using the fixed approximate lead-time that maintained by the business. However, to date there have not been solutions available to enable this to happen in a consistent, reliable, and trackable way. The in-transit material ownership transfer from Vendor (Original Device Manufacturer (ODM)/contract manufacturer (CM)) to Product Seller is currently based on lead time which is inaccurate as explained above. In some instances, a logistics provider may quote a delivery based on a user (carrier) maintained distance via a specific mode of transportation (e.g., a ship) from the originating location to the destination location, but there is no intelligence to provide freight charges based on actual distance traveled with real-time invoicing and reconciliation.

Figure 4:
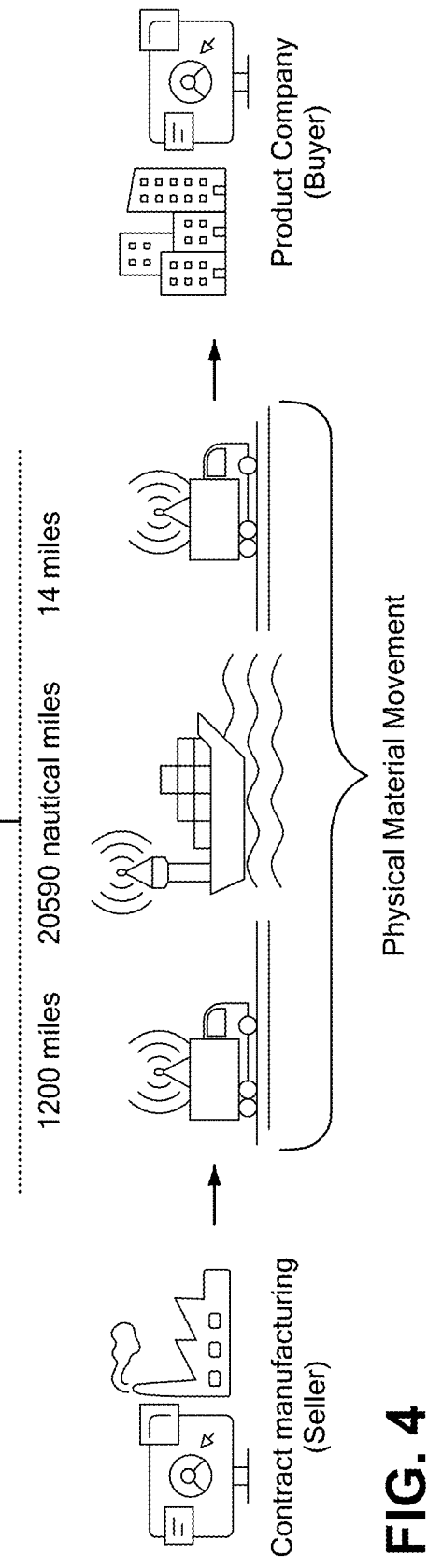
FIG. 4 is an example illustration showing material ownership based on distance, in accordance with one embodiment.

FIG. 4 is an example illustration showing material ownership based on distance, in accordance with one embodiment. As FIG. 4 illustrates, an "event" (e.g., change in material ownership) is triggered by physical material movement reaching a predetermined distance milestone, where there is communication directly with one or more of the carriers (e.g., as indicated via the wireless transmitter icons in FIG. 4), such that one or more indicators (e.g., sensors, GPS trackers, mobile computing platforms, etc.) are able to communicate distance information to an entity (e.g., a remote central server), so that an event, such as reaching a distance milestone, can be determined (e.g., based on coordinates or other information contained in the communication).

At least some embodiments provided herein help to address at least some of these issues by providing arrangements which are able to provide real-time in-transit material ownership transfer based on distance and material position from destination, using GPS sensors for tracking and transferring ownership based on distance, to help improve this operation more cost effectively.

At least some embodiments provided herein help to address at least some of these issues by providing arrangements which are able to calculate freight charges based on actual distance traveled, real-time invoicing, and reconciliation, by leveraging the IoT and a distributed ledger (DLT). Although there are providers who can use IoT to help enable shipping to track and trace material, at least some embodiments herein provide improvements over these arrangements, by integrating Edge Computing and IoT with DLT to calculate the actual distance covered by the carrier and trigger a smart contract to calculate freight and generate freight invoice on a real-time basis.

In some embodiments, if an entity that is known as a supply chain pioneer, (e.g., Dell) builds a trustable platform usable for tracking real-time material movement and ownership, such a platform can be configured to attract many global supply chain vendors to use this platform for their material ownership, as well.

In certain embodiments herein a solution is provided to collect and store events (e.g., actions that happen during transit, milestones reached, etc.) in a secured environment. As part of this solution, the discrete agreement of material ownership is created transparently, with a smart contract accepting the ownership. In certain embodiments, at a high level, a proposed framework is provided that is based on using permissioned Distributed Ledger (DLT) for providing "Internet of Value". The framework's distributed and decentralized nature allows "peer to peer" exchange of value. In certain embodiments, when integrated with Edge computing and an IoT system, the framework helps to meet important business objectives, such as optimizing costs and increasing speed of transactions. In certain embodiments, the framework enables value through payment using digital currency.

Figure 5A:
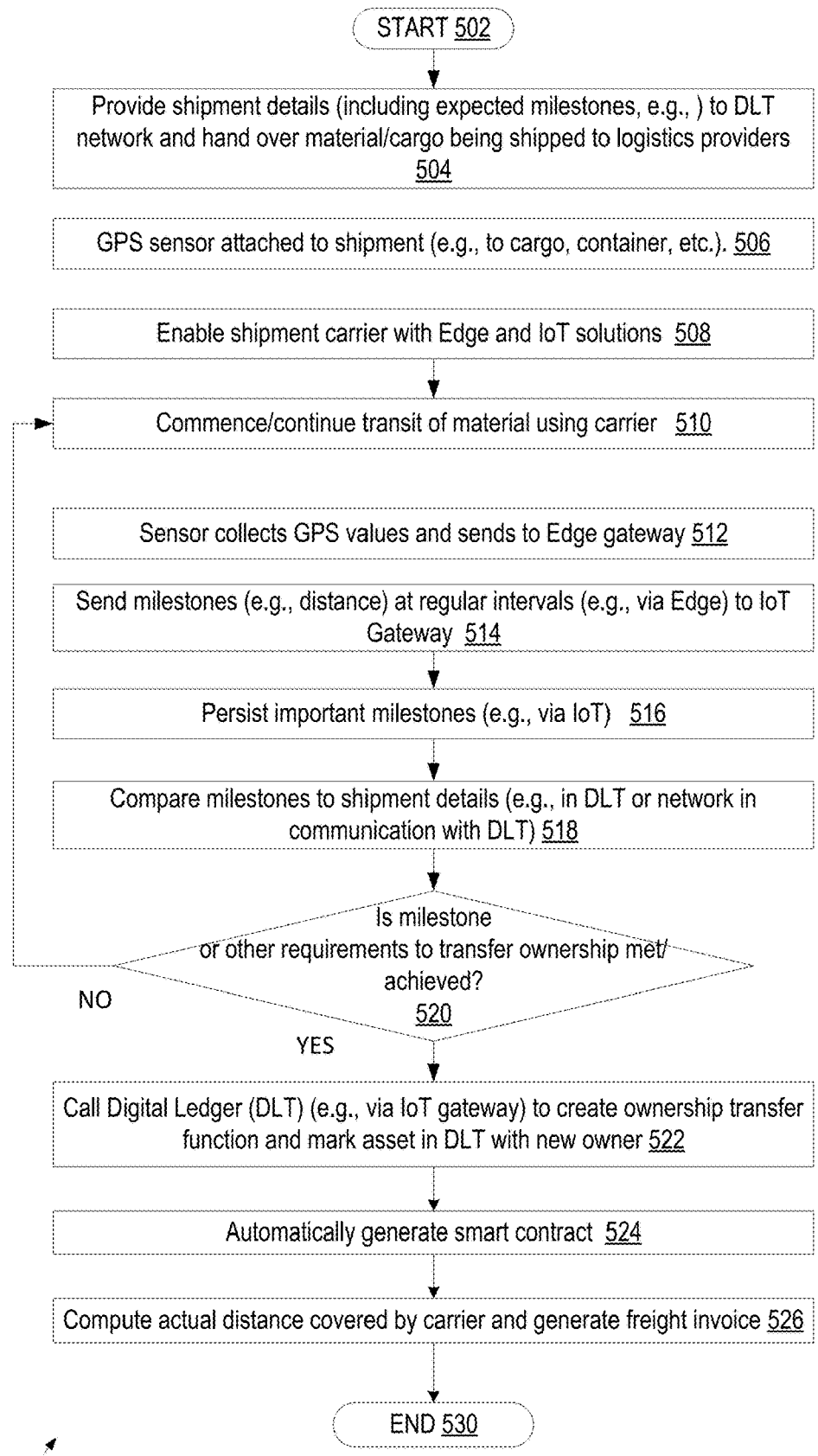
FIG. 5A is a first flow chart, at a high level, of a process for material ownership transfer, in accordance with at least one embodiment.
Figure 5B:
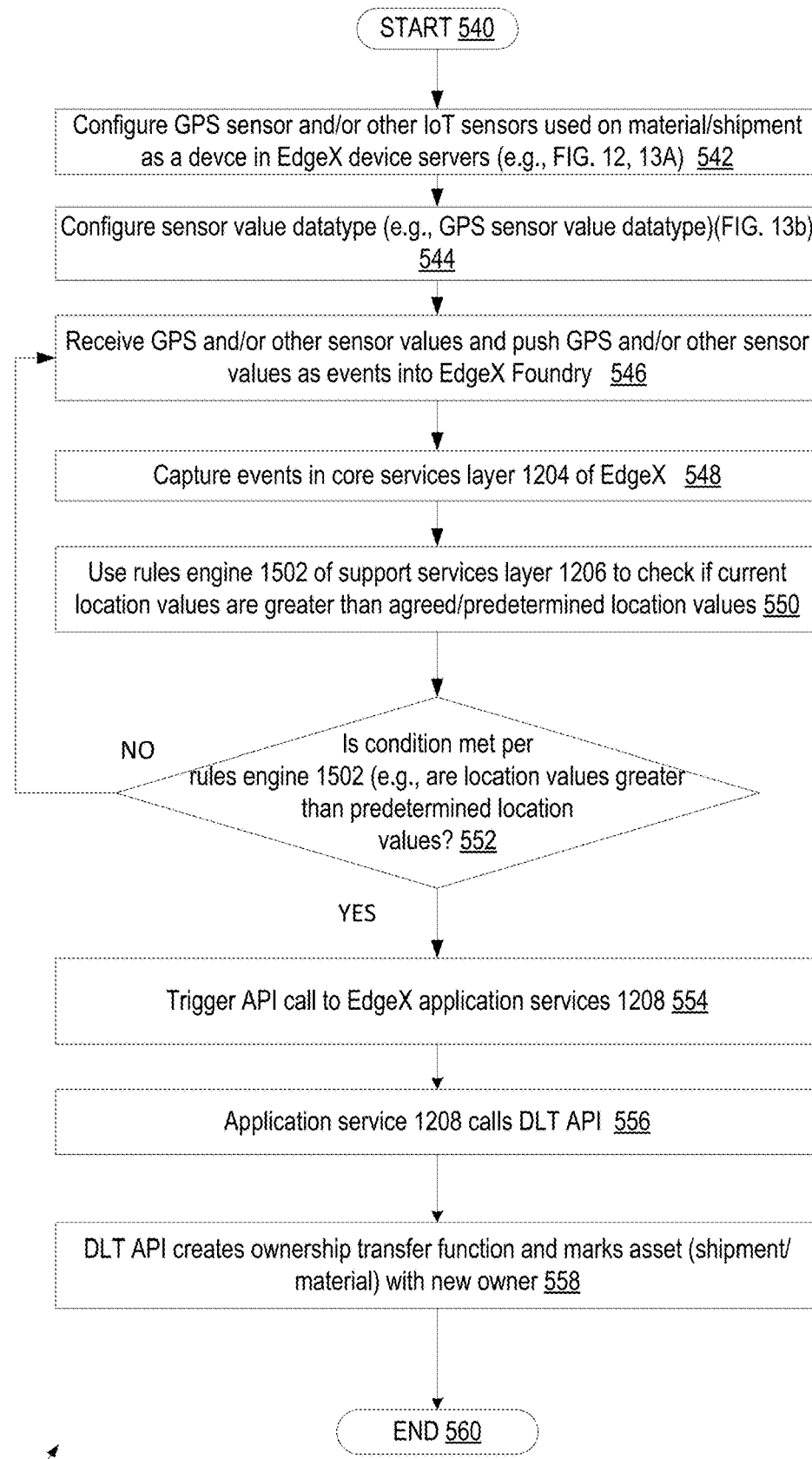
FIG. 5B is a second flow chart of a process for material ownership transfer, showing process steps in greater detail.

At a high level, in some embodiments, a framework is provided that provides a multi-layer architecture interfacing with Distributed Ledger (DLT) as well as Edge Gateway interfacing with GPS sensor components and IOT gateway which interacts with Enterprise IT Systems. The framework interfaces with three Organizations (Vendor, Logistics Provider and Product Seller) and uses a private permissioned Distributed Ledger (DLT) network to perform the following actions shown in the flowcharts of FIGS. 5A-6B, as discussed further herein. FIG. 5A is a first flow chart 500A, at a high level, of a process for material ownership transfer, in accordance with at least one embodiment. FIG. 5B is a second flow chart 500B of a process for material ownership transfer, showing process steps in greater detail. FIG. 7 is a high level block diagram of an architecture 700 in accordance with some embodiments.

Referring first to FIG. 5A and to FIG. 7, in block 504, shipment details (e.g., including expected milestones during transport, such as distance milestones) are provided to or shared with a DLT network, and the materials to be shipped are handed over to logistics providers. For example, in some embodiments, a vendor (ODM/CM) shares the shipment details in the DLT network and hands over the materials. In block 506, a GPS sensor 701 is attached to a shipment. The GPS sensor 701, in certain embodiments, is in operable communication with the DLT network, e.g., via an edge gateway 836 and also via an IoT gateway 834 (FIG. 7). The GPS sensor 701 can be attached to the cargo itself, to a container carrying the cargo, or even to the vehicle/ship itself that is carrying the cargo, as will be appreciated. The attaching of the GPS sensor 701 can be done at almost any time in the shipping process, by any entity. For example, an original manufacturer can couple sensors 701 such as GPS sensors to each article being shipped or to a container or box that contains one or more articles to be shipped. A logistics provider can couple sensors 701 such as GPS sensors to shipments or to containers configured to carry shipments. A vehicle (e.g., ship) that performs the transport can attach the GPS sensors 701 or can itself be fitted with one or more sensors. The GPS sensor 701, in certain embodiments, provides information relating to a geographical position of the GPS sensor 701 (e.g., in latitude and longitude coordinates), which inherently also indicates the geographical position of any entity, article, container, material, etc., to which the GPS sensor 701 is operably coupled, installed, attached, etc. As will be understood, the GPS sensor 701, and material to which it is being attached, are remote from the two or more parties (e.g., a manufacturer and a purchaser, or vendor and product seller, etc.) who have interest in ensuring the material being shipped, hence the need to monitor the transit of the material. Throughout transit, there is a real-time status associated with the material being shipped, and in certain embodiments, the real-time status is tracked by the DLT network, e.g., in a digital ledger (DLT).

In block 508, the carrier is enabled with Edge computing and IoT solutions, such as an Edge Gateway 836 and an IoT Gateway 834. For example, a logistics provider can enable the carrier with hardware usable as an Edge Gateway 836 or which is configured to interact with one or more Edge Gateways 836, which are further configured to interact with one or more IoT gateways 834. In certain embodiments, the Edge gateway 836 is configured receive information from an IoT sensor 701, to determine if the received IoT sensor information represents a predetermined milestone and to send information about milestones 705 that are met (transmit milestone information) to the IoT gateway 834, where the milestones 705, in certain embodiments, include information relating to location and/or distance traveled) in regular intervals (as discussed further herein in connection with FIG. 5B). As travel commences (block 510), the sensor 701 collects GPS sensor values 703 and sends them to the Edge gateway (512). When GPS milestones 705 are reached, such as particular distance milestones, they are sent, e.g., via the Edge Gateway 836, to the IoT gateway 834 (block 514). In certain embodiments, important milestones are persisted (bock) 530), e.g., via the IoT gateway 834 and stored in persistent storage 720. In some embodiments, the storage 720 is on a cloud network and/or is accessible to a cloud network.

Milestones are compared to shipment details (block 518), such as those in the DLT. If the milestone or other requirements are met/achieved to allow transfer of ownership (answer at block 520 is "YES"), then the digital ledger is called (e.g., via the IoT Gateway 834) to create an ownership transfer function and to mark a given asset (e.g., material being shipped) in the DLT with the new owner (block 545). If the milestone is not yet met (answer at block 520 is "NO"), then transit continues, with continued collection of sensor information, and processing flows back to block 510. In block 524, once the milestone is reached, smart contracts are created automatically to transfer the in-transit materials ownership based on the milestone/agreement (actual distance covered) from vendor to the product seller. In addition, in certain embodiments, the actual distance covered by the carrier is computed and a freight invoice is generated (block 526). These actions in the first flowchart 500A help to ensure that there is a flow of in-transit material ownership that is trustworthy, traceable and transparent in-transit material ownership.

The method of FIG. 5A, in certain embodiments, is implemented using a unique and advantageous configuration of edge computing systems, GPS sensors, and edge and IOT gateways, which work together as a distributed remote special purpose computer system, e.g., as shown in FIG. 7, which is an architecture 700, at a high level, in accordance with some embodiments, which is usable for implementing any of the methods of FIGS. 5A-6B. FIG. 5B is a second flow chart 500b of a process for material ownership transfer, showing process steps in greater detail, using this distributed remote special purpose-computer system.

Figures 12, 13A, 13B:
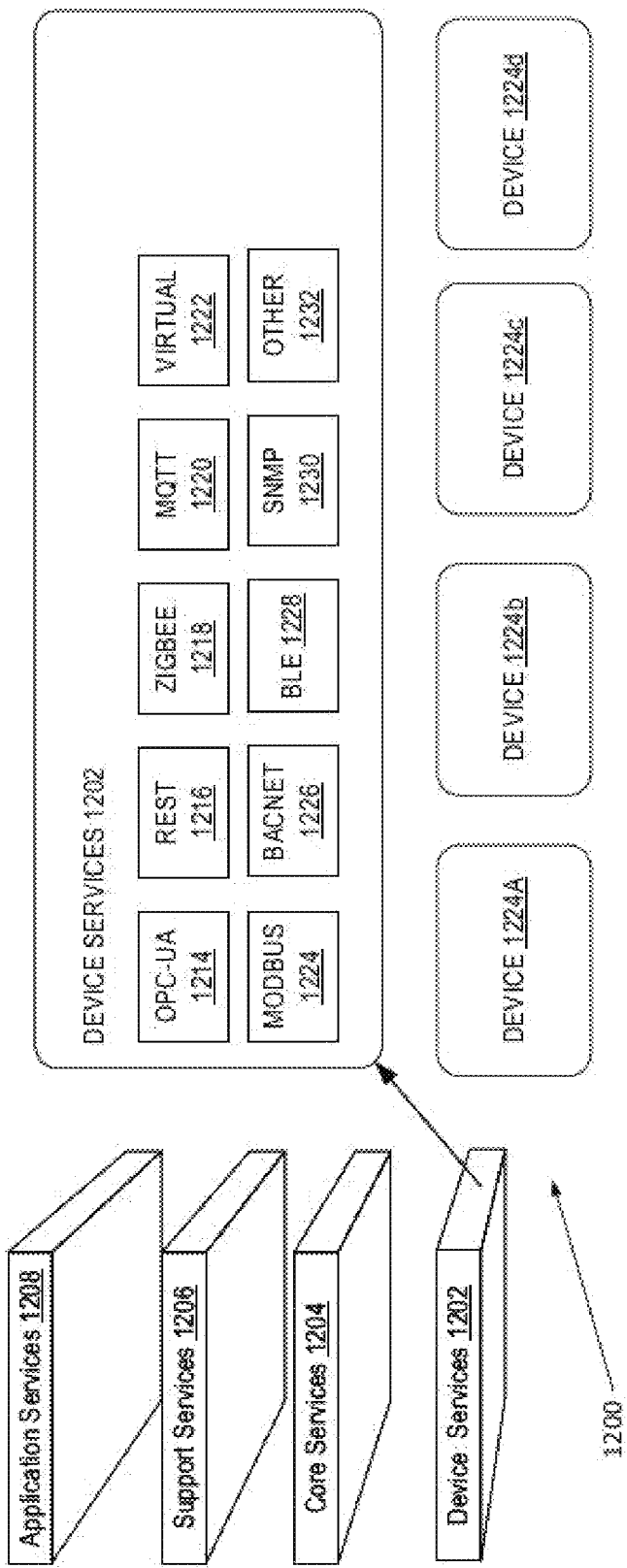
FIG. 12 is an illustration of the EdgeX device services, in accordance with one embodiment.
FIG. 13A is an illustration of an exemplary device configuration of a global positioning system (GPS) sensor, in accordance with one embodiment.
FIG. 13B is an illustration of an example configuration of a GPS sensor values datatype, in accordance with one embodiment.

Referring to FIGS. 5B and 7, in block 542, an IoT sensor 701, such as the global position system (GPS) sensor 703, is configured as a device in the EdgeX device servers (as shown in FIG. 12, as a "device 1224a"). The GPS sensor 703 is configured to be used on or with the material being shipped, and can be attached to the material, installed in the material, attached to or in a container carrying the material, or even attached to or contained in a vehicle (e.g., a vessel) that is moving the shipment. Referring briefly to FIG. 12, FIG. 12 is an illustration 1200 of the EdgeX device services 1202 (also referred to herein as device services layer 1202), in accordance with one embodiment. As is known, EdgeX Foundry incorporates a collection of open source micro services that are into four service layers (Core Services Layer 1204, Supporting Services Layer 1206, Application Services Layer 1208 and Device Services Layer 1202) as well as two underlying system services (security and system management). The Service Layers traverse from the edge of the physical realm (from the Device Services Layer) to the edge of the information realm (that of the Application Services Layer), with the Core and Supporting Services Layers at the center, as shown in FIG. 12. As shown in FIG. 12, the GPS sensor 707 is configured as "device 1224a" in device services 1202.

Figure 6A:
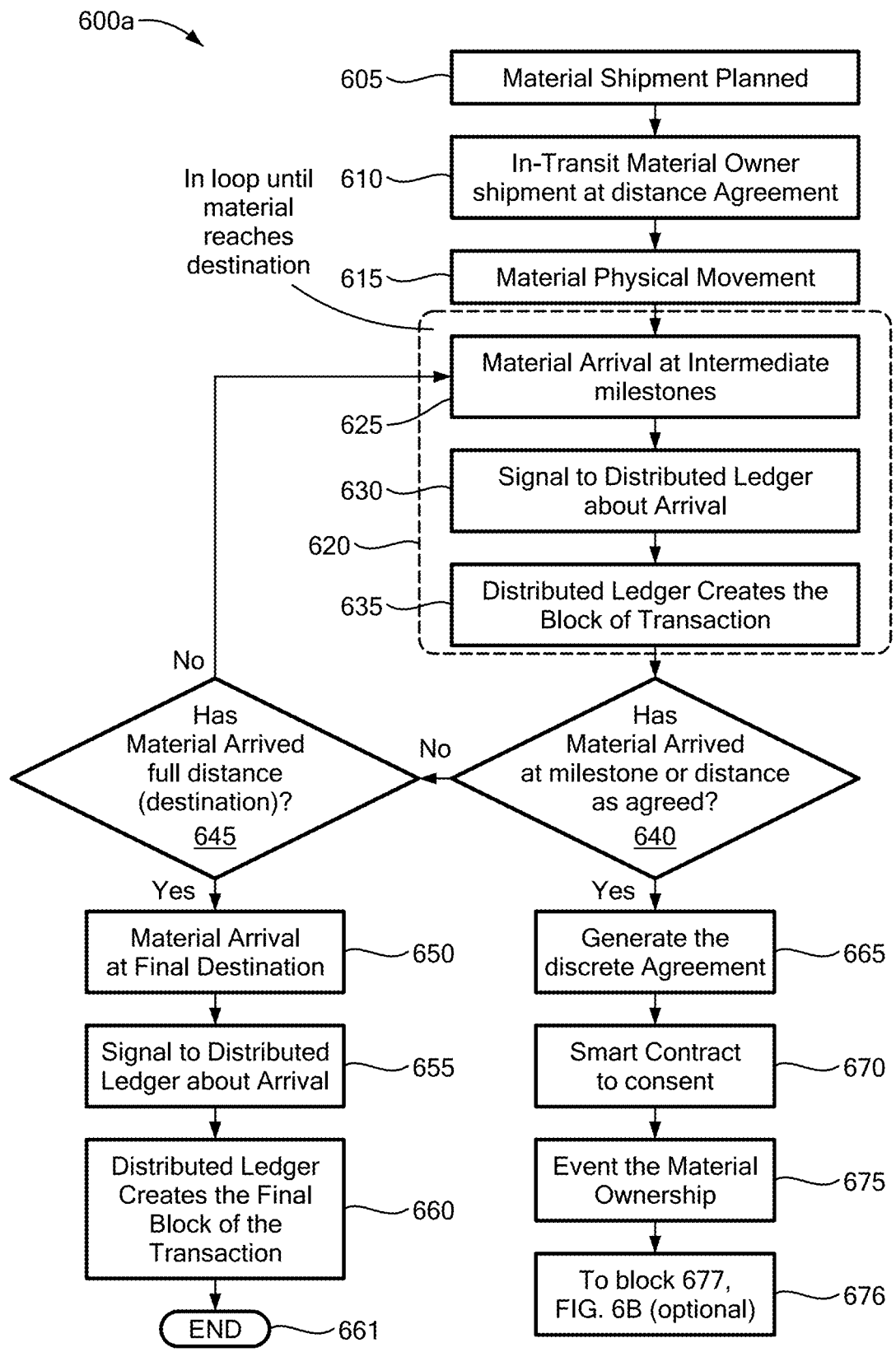
FIG. 6A is a first part of a third flowchart showing, in greater detail, the operational flow of the first flowchart of FIG. 5A, in certain embodiments.
Figure 6B:
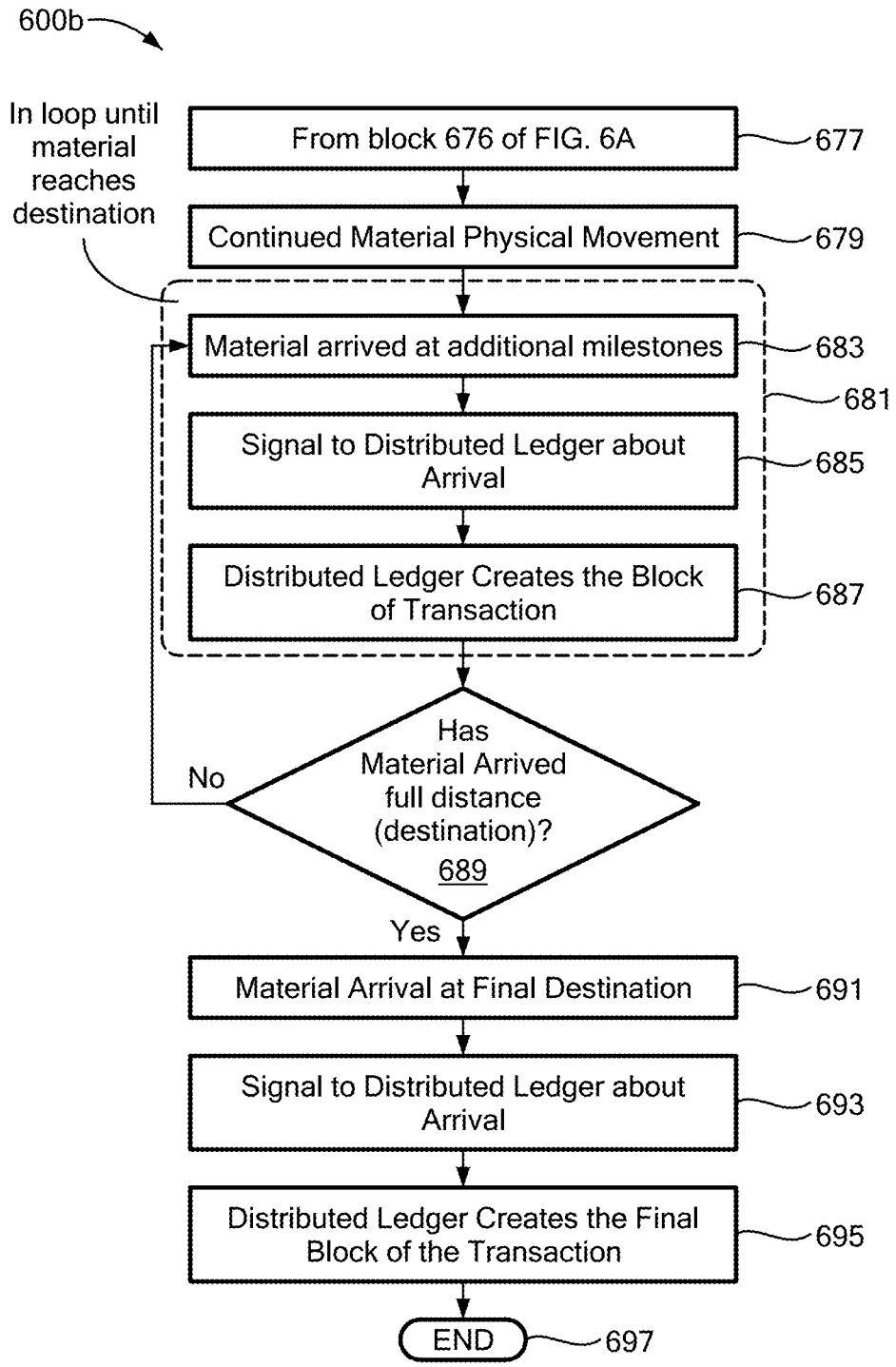
FIG. 6B is a second part of the third flowchart showing, in greater detail, the operational flow of the first flowchart of FIG. 5A, in certain embodiments.
Figure 7:
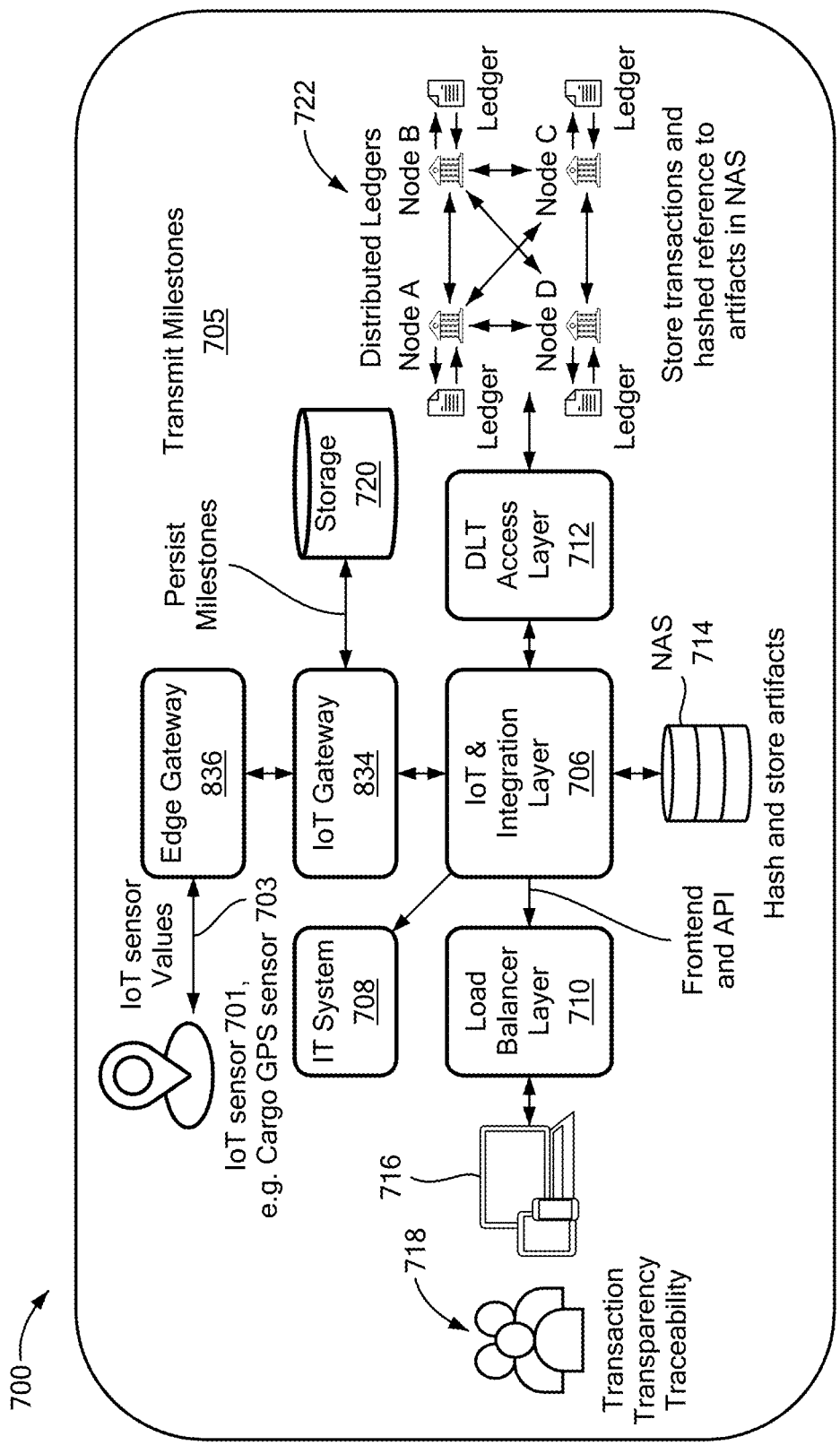
FIG. 7 is a high level block diagram of an architecture in accordance with some embodiments, which is configured to run any of the methods of FIGS. 5A-6B.

Referring briefly to FIG. 13A, FIG. 13A is an illustration of an exemplary device configuration of a global positioning system (GPS) sensor, in accordance with one embodiment, which is usable in the system of FIG. 7 and with the method of FIGS. 6A and 6B. FIG. 13B is an illustration of an example configuration of a GPS sensor values datatype, in accordance with one embodiment. As FIG. 13B shows, the datatype includes parameters that are customized for an example wherein GPS sensor 701 is tracking latitude, longitude, time, and speed. These examples are illustrative and not limiting. Those of skill in the art will appreciate that one or more other types of sensors, especially IoT sensors, may be used instead of or in connection with GPS sensors, to help determine whether requirements for meeting a milestone are reached. For example, other types of IoT sensors that may be able to provide an indication that indicates that a milestone is reached include, but are not limited to, temperature sensors, humidity sensors, pressure sensors, proximity sensors, accelerometers, gas sensors, gyroscopic sensors, optical sensors, infrared sensors, and the like. These additional sensors might be able to provide additional information about material in transit that may or may not impact other information, such as milestones being reached, such as information possibly indicative of the physical status or physical condition of the material being shipped. A product selling company may not want to take ownership of a material shipment solely based on GPS sensor information but may also want to ensure as well that events of concern have not taken place during transit. For example, a customer may not only want to know that material being shipped has reached a certain latitude and longitude position (e.g., via an IoT GPS sensor), but also may want to ensure that water damage, heat damage, or drop damage has not taken place during transit, which is information that these other types of IoT sensors can help to provide. In some embodiments, a smart contract may be generated not based on distance, but on one or more other conditions being met throughout the transit, for example. Thus, even though the specific type of sensor mentioned in FIGS. 5A-6B is discussed with the example of GPS coordinates and a GPS sensor, it should be understood that these methods are likewise applicable to other types of sensors, including conditioning a determination that a milestone has been met, and/or that a smart contract can be generated, based on a given sensor providing information that satisfies a give predetermined condition.

Figure 14:
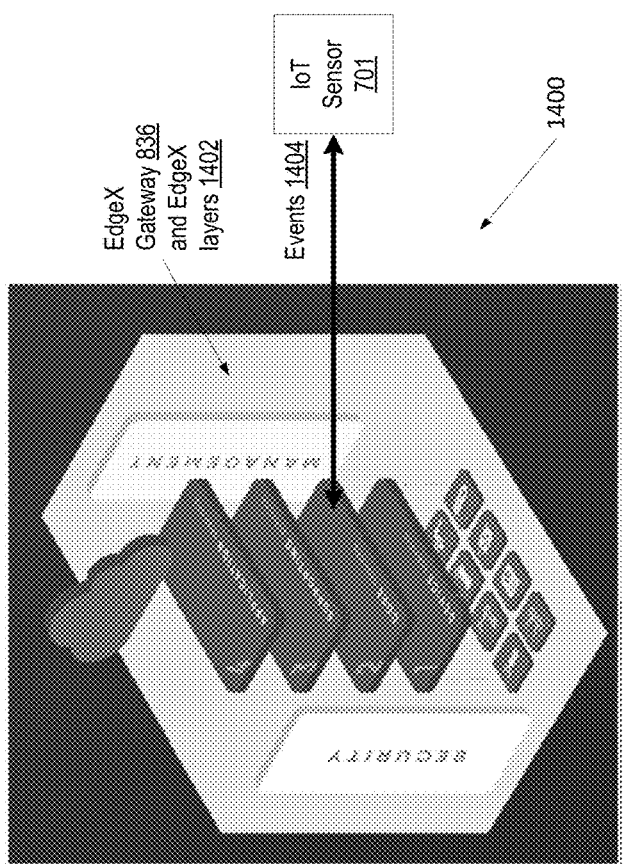
FIG. 14 is an illustration of EdgeX layers, in accordance with one embodiment.
Figure 15:
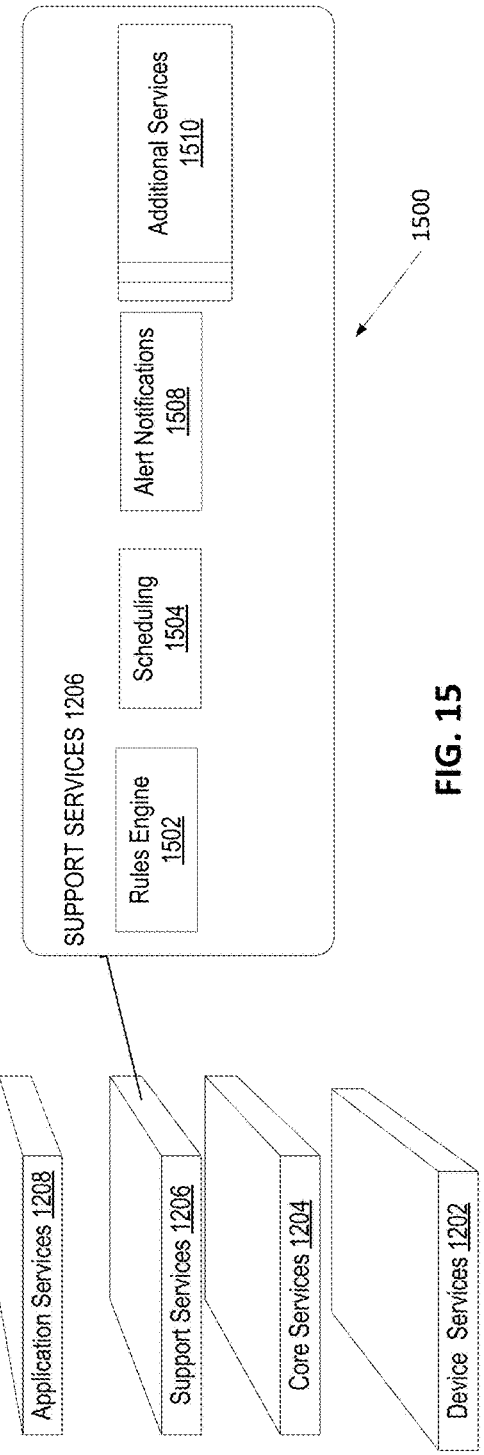
FIG. 15 is an example illustration of EdgeX supporting services, in accordance with one embodiment.
Figure 16:
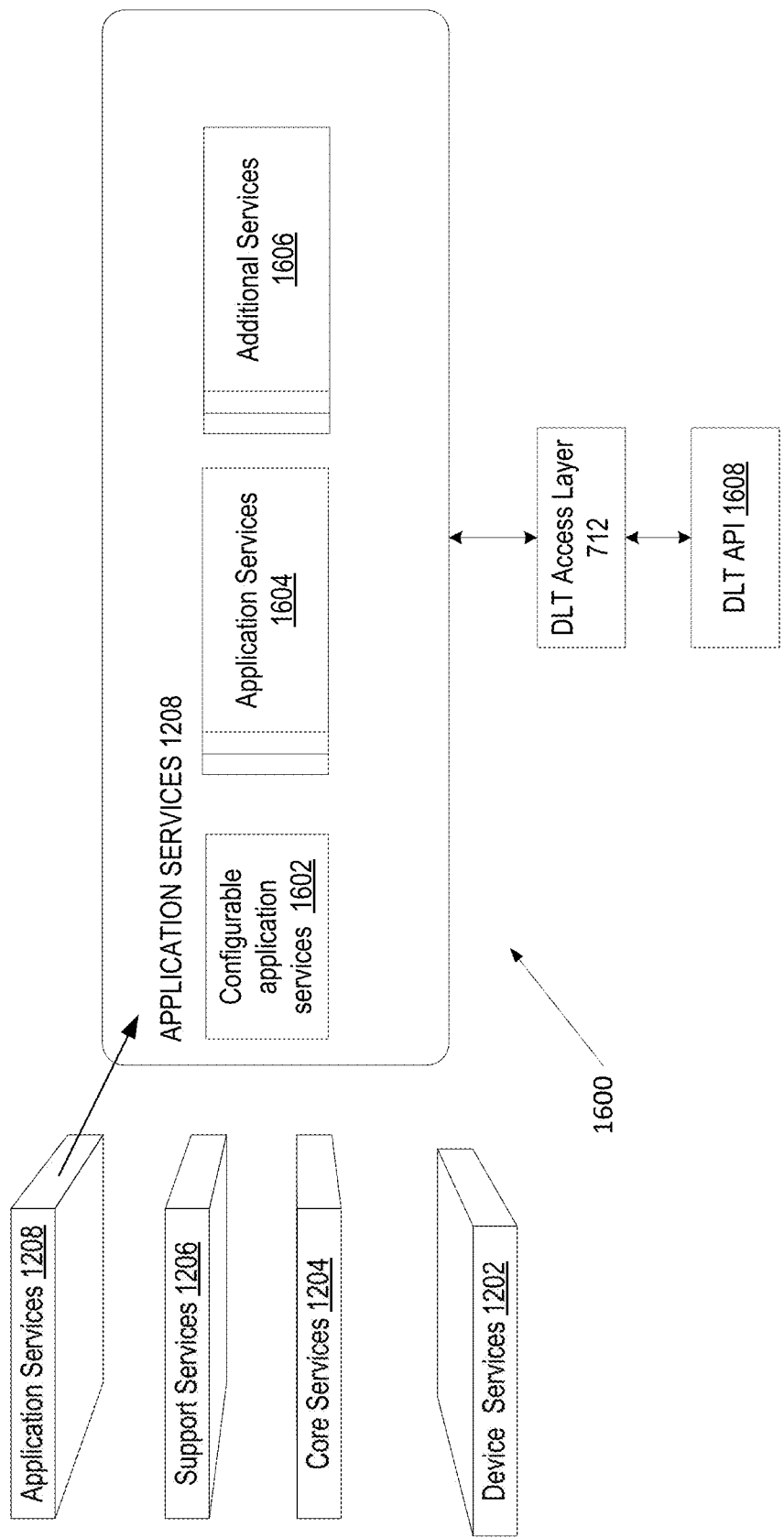
FIG. 16 is an example illustration of EdgeX application service, in accordance with one embodiment.

Referring again to FIGS. 6B and 7, in block 546, as transit takes place, the edge gateway 836 receives information from the one or more IoT sensors being used, such as GPS and/or other sensor values, and pushes the GPS and/or other sensor values as events 1404 into the EdgeX Foundry, as shown in FIG. 14, which is an illustration 1400 of the EdgeX layers 1402, including the core services layer 1204 receiving events 1404 from an IoT sensor 701. In block 550, the rules engine 1502 of the support services layer 1206 is used to check if current location values are greater than agreed upon and/or predetermined values. FIG. 15 is an example illustration 1500 of EdgeX supporting services 1206, in accordance with one embodiment. As will be understood, depending on the sensor 701 being used, the rules engine 1502 can be customized as to what is being checked.

In block 552, a check is made to see if the rules engine determines that a condition is met (e.g., if location values re greater than predetermined location values). If the answer at block 552 is "NO" then processing moves back to block 546 to continue to receive sensor values and push sensor values as events. If the answer at block 552 is "YES", then, and API call is triggered to EdgeX application services 1208, via the FLT access layer 712, for the application services to call the DLT API 1708 (blocks 554 and 556). The DLT API creates an ownership transfer function, which can be configured to trigger the smart contract, and then marks the asset (e.g., shipment, material, etc.) with a new owner.

FIGS. 6A-6B are first and second parts, respectively, of a third flowchart 600A-600B showing, in greater detail, the operational flow of the first flowchart of FIG. 5A, in certain embodiments. Referring to FIG. 6A, in block 605, a material shipment is planned. An agreement is generated (block 610) relating to an in-transit material owner shipment at a given distance. As physical movement of the material takes place (block 615), a set 620 of blocks repeats until the material reaches its distance as agreed and/or its full distance. Within the set 620 of blocks, in one block, material arrives at intermediate milestones (block 625), and a signal is provided to the distributed ledger that the material has arrived at the intermediate milestone (block 630). For example, in certain embodiments, the signal can comprise geographical information, such as latitude and longitude information, global positioning system (GPS) coordinates, and/or other location information, but this is not limiting. For example, as noted previously, depending on the IoT sensor 701, other information can be tracked to determine if a milestone is reached.

Based on the signal that arrives, the distributed ledger creates an entry or block for the transaction (block 635). A check is made (block 640) to see if the material has arrived to the agreed upon distance or has achieved a predetermined milestone. The predetermined milestone/distance being checked in block 640 can correspond to nearly any factor agreed upon in advance, especially where the factor can be measured automatically, such as via GPS coordinates, sending and receiving certain signals with other entities, tracking and locating mechanisms (e.g., radar) or any other suitable method. For example, the predetermined milestone may or may not be solely distance but may also be a combination of distance with another factor, or possibly could be a distance-related milestone that is recognized another way, such as by passing a specific landmark, or making contact with another object or vehicle that is at a known distance or location, etc., or other sensor information types as previously noted. For example, a product seller and a vendor may agree in advance that a certain % of a predetermined travel distance may correspond to the agreed upon distance, in some embodiments. In some embodiments, the predetermined or agreed up on distance could be a specific actual distance (or distance range), specific longitude and latitude, or reaching or passing a specific geographical or marine landmark or reaching a longitude and latitude while also satisfying certain temperature requirements (e.g., to ensure a shipment has not ever defrosted), etc. Those of skill in the art will appreciate that these examples of distance as agreed are exemplary and not limiting.

If the answer at block 640 is "NO," a check is made (block 645) to see if the material has reached the full distance. There are several reasons why processing may proceed such that the answer at block 640 may be "no" but the check is still made at block 645 (and why an answer at block 645 may be "yes," even if the answer at block 640 was no (that is, the material reached the full distance milestone and arrived at destination, but never reached a different agreed-upon milestone along the way). One reason is if an agreed-upon intermediate milestone is a milestone that is reaching or passing through a specific longitude and latitude, and the carrier takes a different route that is able to reach the end destination eventually, but which must be detoured away from the location corresponding to the coordinates of the intermediate milestone. This could happen, for example, if the carrier is a vehicle (e.g., truck) and there is a road detour, traffic, road closure, etc.

Another reason why this additional check is made at block 645 is that a given route that material takes may alter due to weather or other unexpected issues, or the elimination of a previously planned intermediate stop, such that a material shipment travel path may end up be being less than an agreed upon distance, but still reach its endpoint (e.g., "full distance" or final destination). For example, the actual distance required to reach a destination may end up being shorter than an agreed upon distance if a route ends up changing. For example, consider the shape of a right triangle, with a starting point of material transit being at one end of the hypotenuse and the ending point being at the other end. An original transit plan may involve the material shipment traveling along one side of the triangle and then the other (i.e., not traversing along a route that matches the hypotenuse), due to a carrier (e.g., a truck) attempting to avoid an expected poor weather condition or planned road closure along the "hypotenuse" route. Thus, at the time the shipment begins, the expected milestones along the way reflect the "longer" route that goes along the sides of the triangle. If, however, the poor weather condition prediction turns out to be inaccurate, or the road closure does not take place, the carrier may re-route and take the "hypotenuse" route, which would be a shorter net distance traveled to get to the same endpoint, vs what was listed at the time of the transit plan. In that instance, it is possible that the "distance as agreed" of block 640 may never be met, because the carrier actually traveled a shorter distance, yet still reached the end point (leading to a "YES" at block 645). Those of skill in the art will appreciate that there can be multiple other possibilities where the same order or answers can occur.

Referring again to block 645, if the answer is "YES", then the material has arrived at its final destination (block 650) (which may or may not necessarily be identical to the "distance as agreed" of block 640, as explained in the above triangle hypothetical). A signal is sent to the distributed ledger about the arrival of the material at the destination (block 655), and the distributed ledger creates a final block of the transaction (block 660).

If, at block 645, the answer is "NO," that means that the material has not reached the distance as agreed and has not reached the full distance. Thus, the material (effectively) is still moving and tracking continues, at the set of blocks 620, to determine when and if the material arrives at any intermediate milestones and/or at least a distance as agreed.

If at block 640, the answer is "YES" (the material has reached the agreed upon distance, even if that distance is not the full distance), then a material ownership transfer can take place (i.e., even though the material has not yet reached its destination, the material has gone far enough to reach a previously agreed-upon distance wherein change of ownership can take place), assuming no other milestones from other IoT sensors 701 still need to be met. Thus, a discrete agreement is generated (block 668), and a smart contract is generated and sent to both parties, to effect the consent to ownership transfer (block 670). Once the smart contract is generated (which, as is known with smart contracts, parties agree to in advance that it is executed upon its creation), the material ownership is evented (e.g., in the DLT) (block 675).

Optionally, in certain embodiments, even after ownership has changed from vendor to product seller, in-transit checks can still be made to determine when material arrives at the final destination or to check other monitored conditions. For example, as noted previously, depending on the IoT sensors used and the agreement, other types of in-transit checks can be made to ensure the integrity of the shipment. Thus, in FIG. 6A, at block 676, processing moves to the second part 600b of the flowchart 600A of FIG. 6A, which is found in FIG. 6B. Referring to FIG. 6B, processing continues at block 677. Block 681 shows that, optionally, physical movement of the material during transit can continue to be tracked, including optionally arriving at additional milestones (block 683), wherein, if desired, signals can be sent to the distributed ledger about arrival at the additional milestones (block 685), and the distributed ledger creates a block associated with the transaction (block 687). Checks are made, similar to block 645, in block 689, to see whether the material has gone its full distance and/or arrived at its destination. If the answer at block 689 is "no," then processing proceeds back to block 683, to continue monitoring progress as desired. If the answer at block 689 is "yes," then the material has arrived at its final destination (block 691), and a signal is provided to the distributed ledger about arrival (block 693), and the distributed ledger creates the final block of the transaction (block 695).

In certain embodiments, the processes of FIGS. 5A, 5B, 6A, and 6B can be implemented on an architecture and framework that is configured to provide a permissioned distributed ledger (TLT) to provide an "Internet of Value". FIG. 7, which was briefly mentioned previously, is a high level block diagram of an architecture 700 in accordance with some embodiments. The architecture 700 is based on using a permissioned Distributed Ledger (DLT) for providing the "Internet of Value." Its distributed and decentralized nature allows a "peer-to-peer" exchange of value. When integrated with Edge and IOT, as discussed above in certain embodiments herein, this architecture 700 meets the critical business objectives of Realtime Ownership Transfer and optimizes cost. In addition, in certain embodiments the framework or architecture 700, as shown in FIG. 7, provides a multi-layer architecture interfacing with a Distributed Ledger (DLT) and an Edge Gateway interfacing with GPS sensor components and IoT gateway, interacting with Enterprise IT Systems.

Referring to FIG. 7, the architecture 700 of FIG. 7 includes one or more IoT sensors 701 that are linked or coupled to material being shipped, such as a GPS sensor 701, an Edge Gateway 836, an IoT gateway 834, an IoT and Integration layer 706, information technology (IT) systems 708, a load balance layer 710, a DLT access layer 712, network attached storage (NAS) 714, a compute platform 716 configured for interaction with users 718, persistent storage 720 to persist milestones, and one or more distributed ledgers 722.

In certain embodiments, a Root of Trust (RoT) platform adorns two components of the system shown in architecture 700 to help provide a unique solution:

1. The Edge Gateway 836 and IoT Gateway 834 or physical inventory movement; and
2. The one or more distributed ledgers (DLT) 722 to store the immutable events and to enables the trustable insight of inventory track and trace and the ownership transfer during in-transit on agreed smart contract b/w vendor and product company.

An IoT Interface uses the IoT Gateway 834 and is configured, in certain embodiments, to capture the physical movement of the material during transport. For example, in certain embodiments, at each milestone stage, the events are captured (e.g., as noted in FIG. 5B) with details of interest, such as Shipment Id, Material location [e.g., Latitude/Longitude or Location/country details], date and time with time zone, mode of shipment, speed, and carrier details. The IoT Gateway 834, in certain embodiments, also captures the buyer and seller location details at the start and end.

The one or more DLTs 722 are configured, in certain embodiments, to assemble the chain of the transaction by Shipment ID. The first block (e.g., a so-called "Genesis block" which is the first block in a blockchain, as is known) keeps a record of the Seller, Buyer, and the shipping companies participating in that channel and every consecutive block in that channel will contain the tracking data with Shipment ID and material location details. The smart contract (not shown) that is generated (and which is embedded into the code for the system shown in architecture 700) validates the destination/agreed to actual distance covered to trigger the event to own the material.

As shown in FIG. 7, the one or more IoT sensors 701 provide information to the Edge Gateway 836, about a parameter of interest that is being monitored, such as position, and the Edge Gateway 836 determines (e.g., via any one or more of the methods of FIGS. 5A-6B) if any milestones are met based on the information from the IoT sensors 701, and communicates information relating to these milestones, to the IoT Gateway 834. The IoT Gateway 834 persists (stores) information relating to the milestones in persistent storage 720 and also communicates information relating to the milestones met, to the IoT and Integration layer 706. The Integration layer 706 is in operable communication with one or more IT systems 708 and a load balancer layer 710. In certain embodiments, the integration layer 706 helps to read the information the sensor IoT sensor(s) 701 generate. The IoT Gateway 834 gets raw data from the IoT sensors 701 and send the raw data to the integration layer 706. The integration layer 706 takes the formatted and cleaned sensor data and sends it to the IT system 708 (e.g., internal IT systems). The load balancer layer 710 (which in certain embodiments operates as a conventional load balancer, as is known in the art) is in operable communication with the one or more compute platforms, to enable users 718 to have visibility into movement of the material, enabling improved transaction transparency and traceability. The IoT and Integration layer 706 hashes and stores artifacts in the NAS 714 and provides transactions and hashed reference to the artifacts in the NAS 714, to the DLT access layer 712, which is in operable communication with one or more distributed ledgers 722.

In certain embodiments, three organizations are part of the framework and interact with and help perform and/or provide the functionality described above in connection with FIGS. 5A-7. The three organizations (Vendor, Logistics Provider, and Product Seller) interact with a private permissioned Distributed Ledger (DLT) network and perform various activities to facilitate the real-time in-transit material ownership tracking and transfer. For example, in certain embodiments, the seller (e.g., an ODM/CM) shares the shipment details in the Distributed Ledger (DLT) network and hands over the materials to logistics providers. The logistic providers enable the carrier with Edge and IoT solutions, where Edge sends the milestones appropriate to the sensor 101 (like distance) in regular intervals. The IoT gateway persists the one or more critical milestones and calls the Distributed Ledger (DLT) service to trigger the smart contracts. Smart contracts are created to transfer the ownership of the in-transit materials based on the agreement (actual distance covered) from a seller to the product company. In certain embodiments, critical milestones are ones that can trigger a change in the status of the material being shipped, such as a change in ownership, which can happen if one or more predetermined milestones or conditions are met.

Milestones/conditions need not always be related to progress in distance. For example, if a sensor determines that the material being shipped has undergone or experienced a harsh condition that may have caused damage, during transit, depending on the use case and the contract, which might result in an ownership update in the DLT. In another example, it is possible that the one or both of the parties to the agreement to ship material might change during transit, such that after a first product seller took ownership after a predetermined milestone was reached, during the rest of the transit, that first product seller resold the material being shipped to a second product seller.

Figure 8:
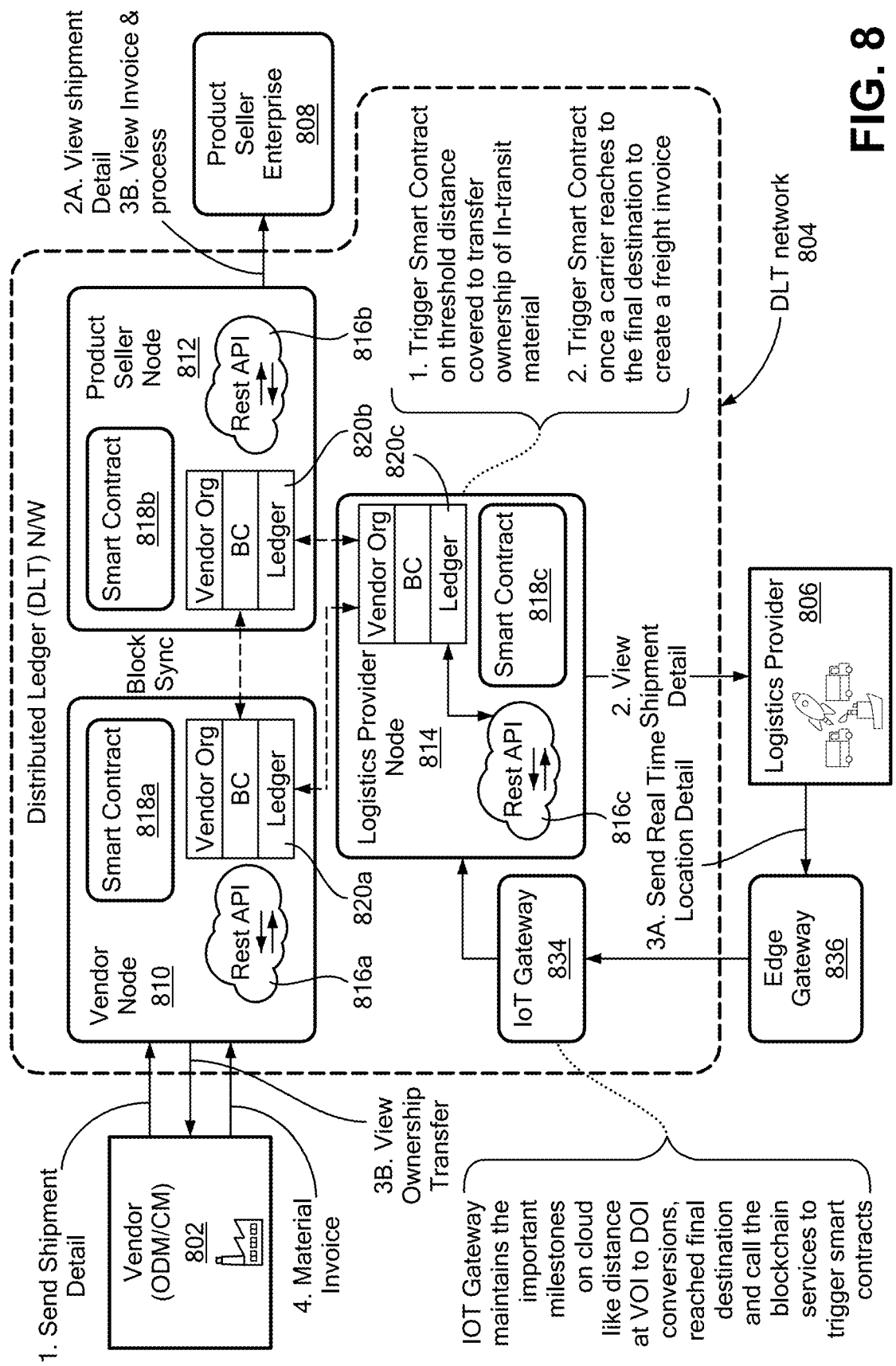
FIG. 8 is an exemplary solution diagram showing details of the interactions between vendor, logistics provider, and product seller, and a distributed ledger (DLT) network, in accordance with one embodiment.
Figure 9:
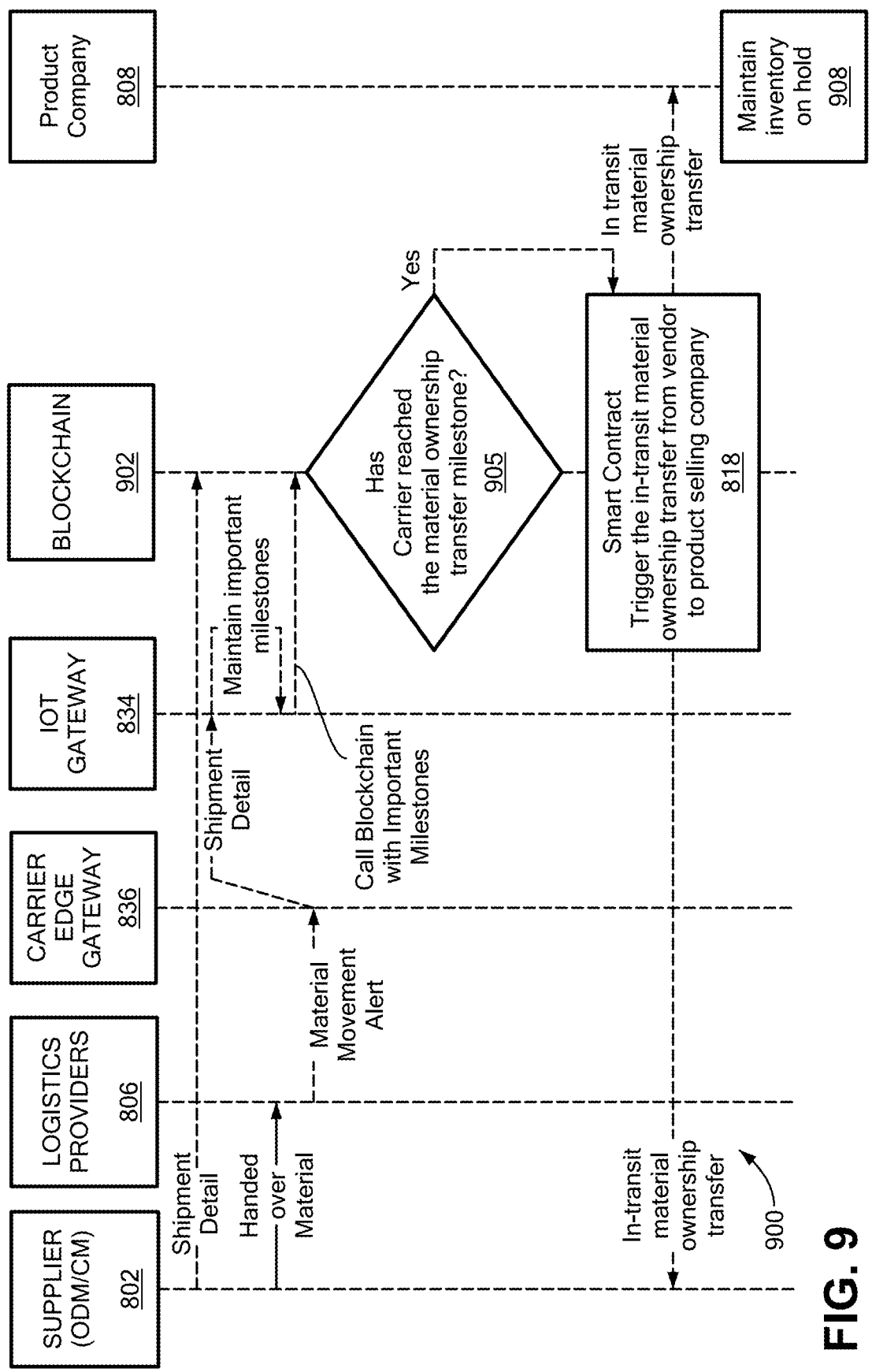
FIG. 9 is a material ownership transfer sequence diagram that further illustrates the order an arrangement of interactions taking place in the solution diagram of FIG. 8, in accordance with one embodiment.

FIG. 8 is an exemplary solution diagram 800 showing details of the interactions between vendor, logistics provider, and product seller, and a distributed ledger (DLT) network, in accordance with one embodiment. FIG. 9 is a material ownership transfer sequence diagram 900 that further illustrates the order an arrangement of interactions taking place in the solution diagram 800 of FIG. 8, in accordance with one embodiment. The operations and interactions of FIGS. 8 and 9 provide further detail to the higher level operations detailed in the flowcharts of FIGS. 5A-6B and the block diagram of FIG. 7.

Referring to FIGS. 8 and 9, at #1 the vendor 802 sends shipment details to a logistics provider 806. The shipment details are all tracked on the DLT network 804, which provides a vendor node 810 for vendor 802, a product seller node 812 for product seller 808, and a logistics provider node 814 for logistics provider 806. The vendor node 810 is configured to provide, maintain and/or interact with a vendor REST API 816a, a vendor smart contract 818a, and vendor organization blockchain (BC) ledger 820a. The product seller node 812 is configured to provide, maintain and/or interact with a product seller REST API 816b, product seller smart contract 818b, and product seller BC ledger 820b. The logistics provider node 814 is configured to provide, maintain and/or interact with a logistics provider REST API 816c, logistics provider smart contract 818c, and logistics provider BC ledger 820b. As FIG. 8 illustrates, the vendor BC ledger 820a, product seller BC ledger 820b, and logistics provider BC ledger 820c are kept in block sync, via techniques known and understood in the art for blockchains.

Referring again to FIGS. 8 and 9, at step 1, vendor 802 sends shipment details, via vendor node 810, and these details are provided to the blockchain 902 via the respective BC ledgers 820*a*, 820*b*, 820*c* maintained at each of the vendor node 810, product seller node 812, and logistics provider nodes 814, respectively. At step 2, the logistics provider 806 views the shipment detail via logistics provider BC ledger 820*c* at logistics provider node 814, and at step 2A, the product seller 808 views the shipment details, via product seller BC ledger 820*b* at product seller node 812. In addition, as shown in FIG. 9, the vendor 802 (also referred to herein as supplier 802) hands over the material to be moved to one or more logistics providers 806 and provides a material movement alert to the carrier edge gateway 836.

Once the shipment has started, the carrier edge gateway 836, at step 3A, sends real-time location details and other milestones, at regular intervals (or at any other desired interval, e.g., responsive to a request from another entity for current location) to the IoT gateway 834. As will be appreciated, if the IoT sensor 701 is a sensor that tracks information other than location information, that type of sensor information likewise can be sent in real-time, or at desired intervals. The IoT gateway 834, in certain embodiments, persists milestones that are deemed to be critical or important. When certain predetermined important milestones are reached (e.g., that a carrier has hit the distance as agreed (block 640 of FIG. 6A) or the full distance (block 645 of FIG. 6A, block 689 of FIG. 6B), the IoT gateway 834 is configured to call the distributed ledger (via the blockchain service and/or blockchain ledgers 820*a*, 820*b*, 820*c*) to trigger the smart contracts 818*a*, 818*b*, 818*c*. For example, in some embodiments, the IoT gateway 834 maintains important milestones in the cloud, such as a milestone corresponding to distance at vessel of interest (VOI) to driver of interest (DOI) conversions, a milestone corresponding to reaching the final destination, and milestones corresponding to calls to the blockchain services, to trigger smart contracts, etc.

As noted previously, at the time of setting the shipment details, the vendor, logistics provider and product seller determine in advance which and what type of milestone(s) need to be reached to lead to generation of a smart contract and/or an in-transit material ownership transfer from vendor 802 to product seller 808. Referring briefly to FIG. 9, when the condition at block 904 (has carrier reached the material ownership transfer milestone yet)? Is met (answer is "YES"), then smart contracts 818*a*, 818*b*, 818*c* are generated, to trigger the in-transit material ownership transfer from vendor 801 to product seller 808. Enabling the RoT (Realtime Ownership Transfer) platform as a service with a smart contract creates a discrete consent for both parties in real-time based on the immutable chain (DLT) of trustable events captured on physical material arrival at each milestone.

For example, as noted in FIG. 1, there can be two conditions leading to triggering a smart contract (the same two conditions corresponding to blocks 640 and 645 in FIG. 6A, and block 689 of FIG. 6B). Condition #1 in FIG. 8 (corresponding to block 640 of FIG. 6A) is when a predetermined/agreed in advance distance has been meet. Condition #2 in FIG. 8 (corresponding to block 645 of FIG. 6A or block 689 of FIG. 6B) is when a carrier has reached the final destination. In certain embodiments, the transfer of in-transit material is based on actual distance and material position from the destination for better cost-effectiveness. In certain embodiments, as noted herein, global positioning system (GPS) sensors 701 are used for tracking and transferring ownership based on the actual distance covered. Those of skill in the art will appreciate that these sensors can be provided in one or more locations, depending on the material being moved and/or the mode of transport. For example, a GPS sensor 701 could be one that is located within the transport vehicle itself (e.g., ship, aircraft, truck, train, etc.); in that instance, a transport vehicle carrying shipments from multiple vendors (potentially for one or more product sellers) is able to provide GPS coordinates associated with multiple different potential agreements, such that smart contracts may be generated at different times for different vendors and product sellers, based on different milestones for each associated agreement between vendor and product seller. GPS sensors also could be attached to the material itself, to a cargo container, etc.

At step 3B the vendor 801 is able to view ownership transfer information and, responsive to that (at step 4) provide a material invoice to the DLT. At step 3B, the product seller 808 is able to view and process the invoice. As FIG. 8 shows, this is accomplished via the DLT. In addition, as FIG. 9 illustrates, once the smart contract has been generated and an in-transit material ownership transfer has taken place, the product seller (also referred to herein as product company) 808 is able to maintain the inventory on hold (block 908 of FIG. 9).

As can be seen above, in at least some embodiments, the transfer of in-transit material is based on actual distance and material position from the destination. However, as noted above, there can be additional requirements imposed in addition to distance and material position, in some embodiments, and there can be multiple ways to track position in addition to using GPS sensors for tracking and transferring ownership based on the actual distance covered. Consider an example of a ship (transport vehicle), slated to travel from the Port of Shanghai, China to Port of Los Angeles, United States, a distance of approximately, 19270 nautical miles, which would take approximately 33 days at an approximate speed of 24 knots. In this example, the ship includes shipments for multiple vendors, for multiple product sellers. For example, the ship includes shipments from vendor A for product seller B and for product seller C, and also shipments from vendor D for product seller B and for product seller E, There could be, for example, at least four different agreements associated with this trip, each triggering a smart contract based on a different milestone, or possibly not even triggering a milestone on this leg of the trip and triggering on a subsequent one. For example:

Vendor A and product seller B have agreed that in-transit material ownership transfer milestone is when 75% of the trip mileage (144452.5 miles) is reached, based on a ship-based GPS sensor.

Vendor A and product seller C have agreed that that in-transit material ownership transfer milestone takes place then the ship carrying the associated material is deemed to be within 100 miles of the Port of Los Angeles, based on information gathered by a land-based radar system near the Port of Los Angeles GPS sensor attached to the material itself.

Vendor D and product seller B have an agreement with logistics provider E that in-transit material ownership transfer milestone is when both 100% of the ship mileage and 75% of a subsequent truck trip mileage of 3000 miles, is reached, and this is tracked based on a GPS sensor attached to the material itself.

Vendor D and product seller E have agreed that in-transit material ownership transfer milestone is when 100% of the trip mileage is reached and the cargo has been unloaded to the West Basin Container Terminal at GPS Coordinates 33.7564° N, 118.2890° W, based on a plurality of GPS sensors coupled to a plurality of cargo containers.

These hypothetical contracts are, of course, exemplary and not limiting. In addition, as one of skill in the art will appreciate, although use of Edge computing and distributed ledgers are discussed above as usable to help implement at least some embodiments herein, there can be many other technologies that are usable.

In one example embodiment that has been tested, for example, a system for real-time in transmit movement of material was implemented using IoT sensors, an EdgeX Foundry IoT Gateway, and a Hyperledger permissioned Distributed Ledger (DLT) framework. In this example embodiment, the material being moved is mounted with a GPS sensor attached to a Raspberry Pi processor, which also has been configured with EdgeX. FIG. 10 is an illustration of an exemplary EdgeX containers list, in accordance with one embodiment, that was generated with this test embodiment. The sensor collected the latitude and longitudinal values and sent them to the EdgeX Foundry gateway. For example, FIG. 11 is an illustration of a sample format of GPS output of the GPS sensor, in accordance with the test embodiment.

At least some embodiments herein may be able to be combined with the teachings of one or more of the following commonly assigned U.S. patents and patent applications, each of which is incorporated by reference:

U.S. Pat. No. 11,012,426, entitled "SECURE DATA POOLS", issued on May 18, 2021;
U.S. Pat. No. 10,855,778, entitled, "DISTRIBUTED LEDGER FOR EDGE SERVER MANAGEMENT," issued on Dec. 1, 2020;
U.S. Pat. No. 10,855,758, entitled "DECENTRALIZED COMPUTING RESOURCE MANAGEMENT USING DISTRIBUTED LEDGER," issued on Dec. 1, 2020.

Figure 17:
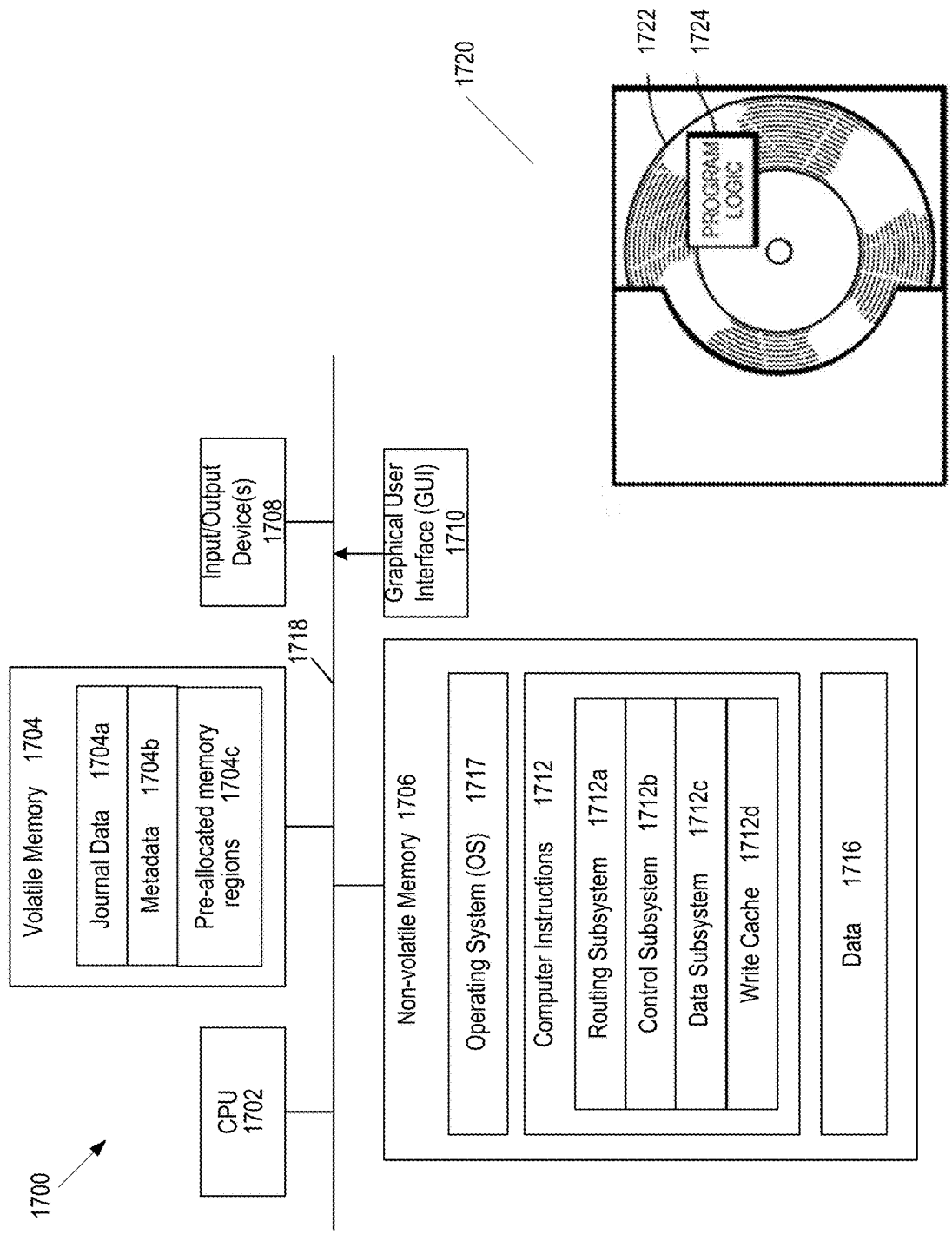
FIG. 17 is a block diagram of an exemplary computer system usable with at least some of the systems and methods of FIGS. 1-16, in accordance with one embodiment.

FIG. 17 is a block diagram of an exemplary computer system 1700 usable with at least some of the systems and apparatuses of FIGS. 1-17, in accordance with one embodiment. Reference is made briefly to FIG. 17, which shows a block diagram of a computer system 1700 usable with at least some embodiments. The computer system 1700 also can be used to implement all or part of any of the methods, systems, and/or devices described herein.

As shown in FIG. 17, computer system 1700 may include processor/central processing unit (CPU) 1702, volatile memory 1704 (e.g., RAM), non-volatile memory 1706 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 1710 (e.g., a touchscreen, a display, and so forth) and input and/or output (I/O) device 1708 (e.g., a mouse, a keyboard, etc.). Non-volatile memory 1706 stores, e.g., journal data 1704a, metadata 1704b, and pre-allocated memory regions 1704c. The non-volatile memory, 1706 can include, in some embodiments, an operating system 1714, and computer instructions 1712, and data 1716. In certain embodiment, the non-volatile memory 1706 is configured to be a memory storing instructions that are executed by a processor, such as processor/CPU 1702. In certain embodiments, the computer instructions 1712 are configured to provide several subsystems, including a routing subsystem 1712A, a control subsystem 1712b, a data subsystem 1712c, and a write cache 1712d. In certain embodiments, the computer instructions 1712 are executed by the processor/CPU 1702 out of volatile memory 1704 to implement and/or perform at least a portion of the systems and processes shown in FIGS. 1-17. Program code also may be applied to data entered using an input device or GUI 1710 or received from I/O device 1708.

The systems, architectures, and processes of FIGS. 1-17 are not limited to use with the hardware and software described and illustrated herein and may find applicability in any computing or processing environment and with any type of machine or set of machines that may be capable of running a computer program and/or of implementing a radar system (including, in some embodiments, software defined radar). The processes described herein may be implemented in hardware, software, or a combination of the two. The logic for carrying out the methods discussed herein may be embodied as part of the system described in FIG. 17. The processes and systems described herein are not limited to the specific embodiments described, nor are they specifically limited to the specific processing order shown. Rather, any of the blocks of the processes may be re-ordered, combined, or removed, performed in parallel or in serial, as necessary, to achieve the results set forth herein.

Processor/CPU 1702 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital, or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general-purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid-state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

For example, when the program code is loaded into and executed by a machine, such as the computer of FIG. 17, the machine becomes an apparatus for practicing one or more of the described embodiments. When implemented on one or more general-purpose processors, the program code combines with such a processor to provide a unique apparatus that operates analogously to specific logic circuits. As such a general-purpose digital machine can be transformed into a special purpose digital machine. FIG. 17 shows Program Logic 1724 embodied on a computer-readable medium 1720 as shown, and wherein the Logic is encoded in computer-executable code thereby forms a Computer Program Product 1722. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiments, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

Throughout the present disclosure, absent a clear indication to the contrary from the context, it should be understood individual elements as described may be singular or plural in number. For example, the terms "circuit" and "circuitry" may include either a single component or a plurality of components, which are either active and/or passive and are connected or otherwise coupled together to provide the described function. Additionally, terms such as "message" and "signal" may refer to one or more currents, one or more voltages, and/or or a data signal. Within the drawings, like or related elements have like or related alpha, numeric or alphanumeric designators. Further, while the disclosed embodiments have been discussed in the context of implementations using discrete components, including some components that include one or more integrated circuit chips), the functions of any component or circuit may alternatively be implemented using one or more appropriately programmed processors, depending upon the signal frequencies or data rates to be processed and/or the functions being accomplished.

Similarly, in addition, in the Figures of this application, in some instances, a plurality of system elements may be shown as illustrative of a particular system element, and a single system element or may be shown as illustrative of a plurality of particular system elements. It should be understood that showing a plurality of a particular element is not intended to imply that a system or method implemented in accordance with the disclosure herein must comprise more than one of that element, nor is it intended by illustrating a single element that the any disclosure herein is limited to embodiments having only a single one of that respective elements. In addition, the total number of elements shown for a particular system element is not intended to be limiting; those skilled in the art can recognize that the number of a particular system element can, in some instances, be selected to accommodate the particular user needs.

In describing and illustrating the embodiments herein, in the text and in the figures, specific terminology (e.g., language, phrases, product brands names, etc.) may be used for the sake of clarity. These names are provided by way of example only and are not limiting. The embodiments described herein are not limited to the specific terminology so selected, and each specific term at least includes all grammatical, literal, scientific, technical, and functional equivalents, as well as anything else that operates in a similar manner to accomplish a similar purpose. Furthermore, in the illustrations, Figures, and text, specific names may be given to specific features, elements, circuits, modules, tables, software modules, systems, etc. Such terminology used herein, however, is for the purpose of description and not limitation.

Although the embodiments included herein have been described and pictured in an advantageous form with a certain degree of particularity, it is understood that the present disclosure has been made only by way of example, and that numerous changes in the details of construction and combination and arrangement of parts may be made without departing from the spirit and scope of the described embodiments. Having described and illustrated at least some the principles of the technology with reference to specific implementations, it will be recognized that the technology and embodiments described herein can be implemented in many other, different, forms, and in many different environments. The technology and embodiments disclosed herein can be used in combination with other technologies. In addition, all publications and references cited herein are expressly incorporated herein by reference in their entirety. Individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the following claims.

What is claimed is:

1. A computer-implemented method, comprising:
providing a distributed system comprising an edge gateway in operable communication with a first Internet of Things (IoT) sensor and an IoT gateway in operable communication with the edge gateway and with a distributed ledger (DLT) network, wherein the DLT network is accessible to a first party and a second party;
defining, in the DLT network, a transaction to be monitored between the first party and the second party, the transaction related to movement of a monitored entity from a first location associated with the first party, to a second location associated with the second party, wherein, in the DLT network, the transaction is configured so that an ownership of the monitored entity changes from the first party to the second party when the monitored entity reaches a predetermined distance milestone, which corresponds to the monitored entity reaching a real-time geographic position that satisfies at least one of:
a first condition corresponding to the monitored entity covering a first predetermined distance after moving away from the first location; and
a second condition corresponding to the monitored entity reaching a distance position that is determined to be a second predetermined distance away from at least one of the first location and the second location, where the distance position is not the same as either the first location or the second location;
providing to the edge gateway, via the first IoT sensor, first sensor data comprising real-time global positioning system (GPS) coordinates of the monitored entity, during movement of the monitored entity, wherein the edge gateway is configured to compute the real-time geographic position of the monitored entity based on the real-time GPS coordinates;
determining, at the edge gateway, based on the real-time geographic position of the monitored entity, whether the monitored entity has reached the predetermined distance milestone;
tracking, at the IoT gateway, based on information received from the edge gateway, a set of real-time status information of the monitored entity, the set of real-time status information comprising the real-time geographic position of the monitored entity, whether the monitored entity has reached the predetermined distance milestone, and the ownership of the monitored entity;
updating, in real-time, the transaction on the DLT network, based on the set of real-time status information tracked at the IoT gateway;
changing the ownership in the DLT network, in real-time, from the first party to the second party, when, based on the set of real-time status information, the monitored entity has reached the predetermined distance milestone; and
communicating information relating to changing the ownership of the monitored entity, via the DLT network, in real-time, to at least one of the first party and the second party.

2. The computer-implemented method of claim 1, wherein the monitored entity comprises a shipment of material that needs to travel from the first location to the second location.

3. The computer-implemented method of claim 2, wherein the predetermined distance milestone comprises the monitored entity reaching a real-time geographic position that satisfies both the first condition and the second condition.

4. The computer-implemented method of claim 1, wherein the first IoT sensor output comprises a global positioning system (GPS) IoT sensor configured to provide at least one signal comprising information relating to a geographical position of the monitored entity.

5. The computer-implemented method of claim 1, further comprising generating a smart contract in real-time, between the first party and the second party, when the set of real-time status information indicates that the monitored entity has reached the predetermined distance milestone.

6. The computer-implemented method of claim 1, wherein updating the transaction on the DLT network in real time further comprises:
determining one or more additional milestones associated with the transaction, wherein the one or more additional milestones are different than the predetermined distance milestone;
defining a subset of milestones selected from at least one of the predetermined distance milestone and the one or more additional milestones, wherein the subset of milestones comprises milestones that at least one of the first party and the second party has deemed to be critical milestones;
transmitting a first set of information from the edge gateway to the IoT gateway, the first set of information comprising information relating to progress of the monitored entity towards reaching the subset of milestones; and
persisting information relating to progress towards reaching the subset of milestones in a storage location accessible to at least one of the DLT network, a cloud network, the first party, and the second party.

7. The computer-implemented method of claim 1, further comprising generating an invoice for the transaction when the monitored entity reaches at least one of the predetermined distance milestone and the second location.

8. The computer-implemented method of claim 1, wherein the distributed system further comprises a second IoT sensor configured to provide to the edge gateway, during movement of the monitored entity, one or more signals relating to a real-time physical condition of the monitored entity, wherein the second IoT sensor comprises at least one sensor selected from the group consisting of: a temperature sensors, a humidity sensors, a pressure sensors, a proximity sensors, an accelerometers, a gas sensors, a gyroscopic sensors, an optical sensors, and an infrared sensors.

9. The computer-implemented method of claim 8, wherein the set of real-time status information further comprises a condition status based on one or more outputs of the second IoT sensor, and wherein the condition status is indicative of a physical condition of the monitored entity during movement of the monitored entity, the physical condition derived from a value of the one or more outputs of the second IoT sensor.

10. The computer-implemented method of claim 9, wherein the transaction in the DLT network is further defined so that the second party takes ownership of the monitored entity when the monitored entity is determined both to have reached the predetermined distance milestone and also to have satisfied a predetermined physical condition, wherein a satisfaction of the predetermined physical condition is determined based on the condition status of the monitored entity.

11. A system, comprising:
- a processor; and
- a non-volatile memory in operable communication with the processor and storing computer program code that when executed on the processor causes the processor to execute a process operable to perform operations of:
  - providing a distributed system comprising an edge gateway in operable communication with a first Internet of Things (IoT) sensor and an IoT gateway in operable communication with the edge gateway, and with a distributed ledger (DLT) network, wherein the DLT network is accessible to a first party and a second party;
  - defining, in the DLT network, a transaction to be monitored between the first party and the second party, the transaction related to movement of a monitored entity from a first location associated with the first party, to a second location associated with the second party, wherein, in the DLT network, the transaction is configured so that ownership of the monitored entity changes from the first party to the second party when the monitored entity reaches a predetermined distance milestone, which corresponds to the monitored entity reaching a real-time geographic position that satisfies at least one of:
    - a first condition corresponding to the monitored entity covering a first predetermined distance after moving away from the first location; and
    - a second condition corresponding to the monitored entity reaching a distance position that is determined to be a second predetermined distance away from at least one of the first location and the second location, where the distance position is not the same as either the first location or the second location;
  - providing to the edge gateway, via the first IoT sensor, first sensor data comprising real-time global positioning system (GPS) coordinates of the monitored entity, during movement of the monitored entity, wherein the edge gateway is configured to compute the real-time geographic position of the monitored entity based on the real-time GPS coordinates;
  - determining, at the edge gateway, based on the real-time geographic position of the monitored entity, whether the monitored entity has reached the predetermined distance milestone;
  - tracking, at the IoT gateway, based on information received from the edge gateway, a set of real-time status information of the monitored entity, the set of real-time status information comprising the real-time geographic position of the monitored entity, whether the monitored entity has reached the predetermined distance milestone, and the ownership of the monitored entity;
  - updating, in real-time, the transaction on the DLT network, based on the set of real-time status information tracked at the IoT gateway;
  - changing the ownership in the DLT network, in real-time, from the first party to the second party, when, based on the set of real-time status information, the monitored entity has reached the predetermined distance milestone; and
  - communicating information relating to changing the ownership of the monitored entity, via the DLT network, in real-time, to at least one of the first party and the second party.

12. The system of claim 11, wherein the monitored entity comprises a shipment of material that needs to travel from the first location to the second location.

13. The system of claim 11, further comprising providing computer program code that when executed on the processor causes the processor to perform an operation of:
- generating a smart contract in real-time, between the first party and the second party, when the set of real-time status information indicates that the monitored entity has reached the predetermined distance milestone.

14. The system of claim 11, further comprising providing computer program code that when executed on the processor causes the processor to perform operations of:
- determining one or more additional milestones associated with the transaction, wherein the one or more additional milestones are different than the predetermined distance milestone;
- defining a subset of milestones selected from at least one of the predetermined distance milestone and the one or more additional milestones, wherein the subset of milestones comprises milestones that at least one of the first party and the second party has deemed to be critical milestones;
- transmitting a first set of information from an edge gateway to the IoT gateway, the first set of information comprising information relating to progress of the monitored entity towards reaching the subset of milestones; and
- persisting information relating to progress towards reaching the subset of milestones in a storage location accessible to at least one of the DLT network, a cloud network, the first party, and the second party.

15. The system of claim 11, further comprising providing computer program code that when executed on the processor causes the processor to perform operations of:
- determining a physical status of the monitored entity during movement of the monitored entity based on a value of a second IoT sensor configured to provide to the edge gateway, during movement of the monitored entity, one or more signals relating to a real-time physical condition of the monitored entity, wherein the second IoT sensor comprises at least one sensor selected from the group consisting of: a temperature sensors, a humidity sensors, a pressure sensors, a proximity sensors, an accelerometers, a gas sensors, a gyroscopic sensors, an optical sensors, and an infrared sensors.

16. A computer program product including a non-transitory computer readable storage medium having computer program code encoded thereon that when executed on a processor of a computer causes the computer to operate a monitoring system, the computer program product comprising:
- computer program code for a distributed system comprising an edge gateway in operable communication with an Internet of Things (IoT) sensor and an IoT gateway in operable communication with the edge gateway, and with a distributed ledger (DLT) network, wherein the DLT network is accessible to a first party and a second party;

computer program code for defining, in DLT network, a transaction to be monitored between the first party and the second party, the transaction related to movement of a monitored entity from a first location associated with the first party, to a second location associated with the second party, wherein, in the DLT network, the transaction is configured so that an ownership of the monitored entity changes from the first party to the second party when the monitored entity reaches a predetermined distance milestone, which corresponds to the monitored entity reaching a real-time geographic position that satisfies at least one of:
- a first condition corresponding to the monitored entity covering a first predetermined distance after moving away from the first location; and
- a second condition corresponding to the monitored entity reaching a distance position that is determined to be a second predetermined distance away from at least one of the first location and the second location, where the distance position is not the same as either the first location or the second location;

computer program code for providing to the edge gateway, via the IoT sensor, sensor data comprising real-time global positioning system (GPS) coordinates of the monitored entity, during movement of the monitored entity, wherein the edge gateway is configured to compute the real-time geographic position of the monitored entity based on the real-time GPS coordinates;

computer program code for determining, at the edge gateway, based on the real-time geographic position of the monitored entity, whether the monitored entity has reached the predetermined distance milestone;

computer program code for tracking, at the IoT gateway, based on information received from the edge gateway, a set of real-time status information of the monitored entity, the set of real-time status information comprising the real-time geographic position of the monitored entity, whether the monitored entity has reached the predetermined distance milestone, and the ownership of the monitored entity;

computer program code for updating, in real-time, the transaction on the DLT network, based on the set of real-time status information at the IoT gateway;

computer program code for changing the ownership in the DLT network, in real-time, from the first party to the second party, when, based on the real-time status information, the monitored entity has reached the predetermined distance milestone; and computer program code for communicating information relating to changing the ownership of the monitored entity, via the DLT network, in real-time, to at least one of the first party and the second party, via the DLT network.

17. The computer program product of claim 16, further comprising computer program code for generating a smart contract in real-time, between the first party and the second party, when the set of real-time status information indicates that the monitored entity has reached the predetermined distance milestone.

18. The computer program product of claim 16, further comprising:
- computer program code for determining one or more additional milestones associated with the transaction, wherein the one or more additional milestones are different than the distance milestone;
- computer program code for defining a subset of milestones selected from at least one of the predetermined distance milestone and the one or more additional milestones, wherein the subset of milestones comprises milestones that at least one of the first party and the second party has deemed to be critical milestones;
- computer program code for transmitting a first set of information from the edge gateway to the IoT gateway, the first set of information comprising information relating to progress of the monitored entity towards reaching the subset of milestones; and
- computer program code for persisting information relating to progress towards reaching the subset of milestones in a storage location accessible to at least one of the DLT network, a cloud network, the first party, and the second party.

19. The computer-implemented method of claim 1, further comprising communicating, via the DLT network, real-time information indicative of progress of the monitored entity, towards reaching the predetermined distance milestone, to at least one of the first party and the second party.

20. The system of claim 15, further comprising providing computer program code that when executed on the processor causes the processor to perform an operation of:
- defining the transaction in the DLT network so that the second party takes ownership of the monitored entity when the monitored entity is determined both to have reached the predetermined distance milestone and also to have satisfied a predetermined physical condition, wherein a satisfaction of the predetermined physical condition is determined based on the physical status.

* * * * *